US010001289B2

(12) United States Patent
Mowris

(10) Patent No.: US 10,001,289 B2
(45) Date of Patent: Jun. 19, 2018

(54) APPARATUS AND METHODS TO MEASURE ECONOMIZER OUTDOOR AIR FRACTIONS AND FAULT DETECTION DIAGNOSTICS OF AIRFLOW, COOLING CAPACITY, AND HEATING CAPACITY

(71) Applicant: Robert J. Mowris, Olympic Valley, CA (US)

(72) Inventor: Robert J. Mowris, Olympic Valley, CA (US)

( * ) Notice: Subject to any disclaimer, the term of this patent is extended or adjusted under 35 U.S.C. 154(b) by 0 days. days.

(21) Appl. No.: 15/169,586

(22) Filed: May 31, 2016

(65) Prior Publication Data

US 2017/0343227 A1 Nov. 30, 2017

(51) Int. Cl.
*F24F 11/00* (2018.01)

(52) U.S. Cl.
CPC ........ *F24F 11/0001* (2013.01); *F24F 11/006* (2013.01); *F24F 11/0012* (2013.01);
(Continued)

(58) Field of Classification Search
CPC ............... F24F 11/0012; F24F 11/0001; F24F 2011/0002; F24F 2011/0006; F24F 2011/0056; G01K 3/02; G01K 3/06
(Continued)

(56) References Cited

U.S. PATENT DOCUMENTS

| 6,223,544 B1 | 5/2001 | Seem |
| 6,415,617 B1 | 7/2002 | Seem |

(Continued)

FOREIGN PATENT DOCUMENTS

| DE | 2918307 | * 11/1980 |
| JP | 04259832 | * 9/1992 |

OTHER PUBLICATIONS

Hohn, DE2918307TRANS (English Translation), Nov. 1980.*
(Continued)

*Primary Examiner* — Len Tran
*Assistant Examiner* — Eric Ruppert
(74) *Attorney, Agent, or Firm* — Kenneth L. Green; Averill & Green

(57) ABSTRACT

An apparatus and method for measuring or controlling the Outdoor Air Fraction (OAF) ratio through economizer or outdoor air dampers and cabinet to total system airflow and mixed-air humidity ratio and wetbulb temperature for HVAC equipment. An OAF exceeding the minimum regulatory requirements wastes energy and contributes to global warming. OAF is used to optimize economizer damper position either manually or automatically using an economizer Fault Detection Diagnostic controller and actuator to meet minimum outdoor airflow requirements. After the outdoor air damper position is optimized, the mixed-air humidity ratio and mixed-air wetbulb temperature are determined and used with the measured mixed-air drybulb and supply-air drybulb temperatures to evaluate evaporator airflow, cooling capacity, and heating capacity, and, if necessary, provide a visual or electronically-transmitted error code signal indicating maintenance requirements to check or correct economizer damper position, cabinet leakage, airflow, cooling or heating capacity, and/or other faults for the HVAC system.

46 Claims, 10 Drawing Sheets

(52) U.S. Cl.
CPC .......... *F24F 11/0015* (2013.01); *F24F 11/30* (2018.01); *F24F 11/62* (2018.01); *F24F 11/32* (2018.01); *F24F 11/63* (2018.01); *F24F 2011/0002* (2013.01); *F24F 2011/0013* (2013.01); *F24F 2011/0016* (2013.01); *F24F 2011/0052* (2013.01); *F24F 2011/0056* (2013.01); *F24F 2011/0061* (2013.01); *F24F 2110/10* (2018.01); *F24F 2110/12* (2018.01); *F24F 2110/20* (2018.01); *F24F 2110/22* (2018.01); *F24F 2140/40* (2018.01)

(58) Field of Classification Search
USPC .......................................... 165/249, 250, 251
See application file for complete search history.

(56) References Cited

U.S. PATENT DOCUMENTS

| | | |
|---|---|---|
| 7,444,251 B2 | 10/2008 | Nikovski et al. |
| 7,500,368 B2 | 3/2009 | Mowris |
| 2008/0179409 A1* | 7/2008 | Seem ................... F24F 11/0001 236/49.3 |
| 2010/0057258 A1* | 3/2010 | Clanin ................ F24F 11/0001 700/276 |
| 2015/0309120 A1 | 10/2015 | Bujak, Jr. et al. |
| 2017/0023269 A1* | 1/2017 | Gevelber ............. F24F 11/0001 |

OTHER PUBLICATIONS

Suzuki, JP04259832TRANS (English Translation), Sep. 1992.*
Katipamula, PNNL-22941, Oct. 2013, Pacific Northwest National Laboratory.*
PNNL-SA-88958, Mar. 2014, Pacific Northwest National Laboratory.*
Carrier_1995_HVA_Maintenance_Procedures_pp. 145-150, Published 1995.
CEC_400_2008_0047_CMF_RA3_9_RA324, Published 2008.
CDC_400_2012_005_CMF_REV3_pp. RA2_14_35, Published 2012.
RMA_2016_Laboratory_Test_Report_pp. 1_v, Published 2015.
Evaluating Fault Detection and Diagnostics Protocols Applied to Air-Cooled Vapor Compression Air-Conditioners, Published 2012.

* cited by examiner

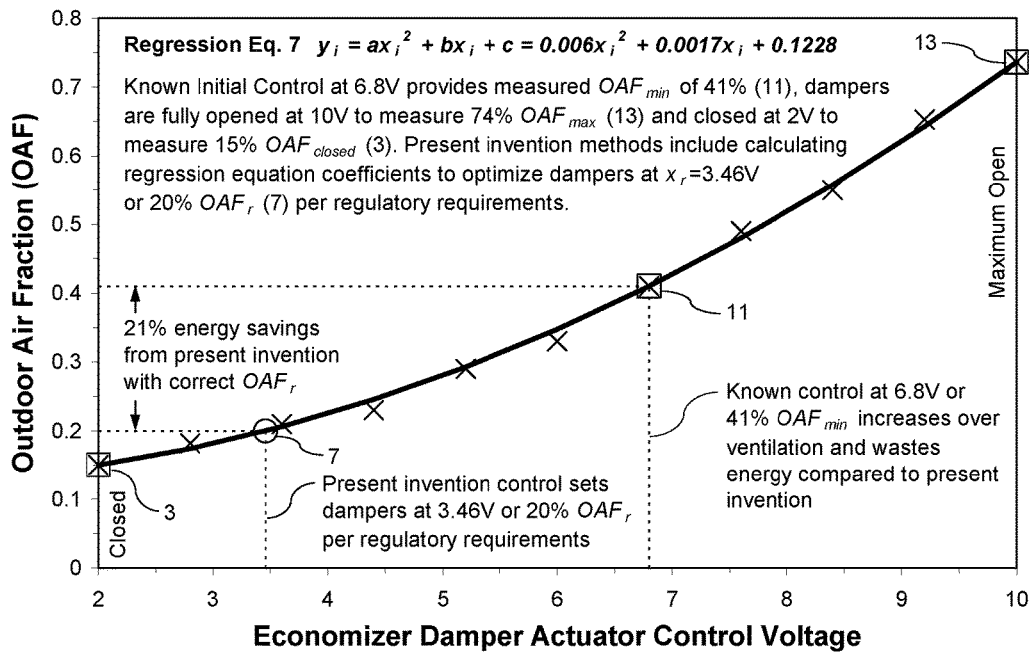

FIG. 9

| Damper Position | $x_i$ (Volts) | $y_i$ (OAF) |
|---|---|---|
| Initial $OAF_{min}$ | 6.8 | 0.41 |
| Maximum $OAF_{max}$ | 10.0 | 0.74 |
| Optimal $OAF_r$ | 3.46 | 0.20 |
| Closed $OAF_{closed}$ | 2.0 | 0.15 |

Eq. 7  $y_i = ax_i^2 + bx_i + c = 0.006x_i^2 + 0.0017x_i + 0.1228$

Eq. 9  $\begin{bmatrix} \sum x_i^4 & \sum x_i^3 & \sum x_i^2 \\ \sum x_i^3 & \sum x_i^2 & \sum x_i \\ \sum x_i^2 & \sum x_i & n \end{bmatrix} \begin{bmatrix} a \\ b \\ c \end{bmatrix} = \begin{bmatrix} \sum x_i^2 y_i \\ \sum x_i y_i \\ \sum y_i \end{bmatrix} = \begin{bmatrix} 12154.14 & 1322.43 & 150.24 \\ 1322.43 & 150.24 & 18.8 \\ 150.24 & 18.8 & 3 \end{bmatrix} \begin{bmatrix} a \\ b \\ c \end{bmatrix} = \begin{bmatrix} 93.16 \\ 10.45 \\ 1.295 \end{bmatrix}$ Eq. 11  $C = \begin{bmatrix} a \\ b \\ c \end{bmatrix} = X^{-1}Y = \begin{bmatrix} 0.0064 & -0.0757 & 0.1516 \\ -0.0757 & 0.9199 & -1.9746 \\ 0.1516 & -1.9746 & 5.1135 \end{bmatrix} \begin{bmatrix} 93.1584 \\ 10.448 \\ 1.296 \end{bmatrix} = \begin{bmatrix} 0.0060 \\ 0.0017 \\ 0.1228 \end{bmatrix}$ Eq. 19  $x_r = \dfrac{-b + \sqrt{b^2 - [4a \times (c - OAF_r)]}}{2a} = \dfrac{-0.0017 + \sqrt{0.0017^2 - [4 \times 0.006 \times (0.1228 - 0.2)]}}{2 \times 0.006} = 3.46\ V$

FIG. 10

| | | Evaporator Entering Mixed-Air Drybulb Temperature, $t_m$ (°F) | | | | | | | | | | | | | | | | | | | | | | | |
|---|---|---|---|---|---|---|---|---|---|---|---|---|---|---|---|---|---|---|---|---|---|---|---|---|---|
| | | 62 | 63 | 64 | 65 | 66 | 67 | 68 | 69 | 70 | 71 | 72 | 73 | 74 | 75 | 76 | 77 | 78 | 79 | 80 | 81 | 82 | 83 | 84 | |
| Evaporator Entering Mixed-Air Wetbulb Temperature, $t^*_m$ (°F) | 50 | 17.1 | 17.5 | 18.0 | 18.5 | 18.9 | 19.4 | 19.9 | 20.4 | 20.9 | 21.4 | 21.9 | 22.5 | 23.0 | 23.6 | 24.1 | | | | | | | | | 50 |
| | 51 | 16.7 | 17.2 | 17.6 | 18.1 | 18.6 | 19.1 | 19.6 | 20.1 | 20.7 | 21.3 | 21.8 | 22.4 | 22.9 | 23.5 | 24.0 | 24.6 | | | | | | | | 51 |
| | 52 | 16.6 | 17.0 | 17.5 | 18.0 | 18.5 | 19.0 | 19.5 | 20.0 | 20.6 | 21.1 | 21.7 | 22.2 | 22.8 | 23.3 | 23.9 | 24.4 | | | | | | | | 52 |
| | 53 | 16.4 | 16.9 | 17.4 | 17.9 | 18.4 | 18.9 | 19.4 | 19.9 | 20.4 | 20.9 | 21.5 | 22.0 | 22.6 | 23.1 | 23.7 | 24.2 | 24.7 | | | | | | | 53 |
| | 54 | 16.0 | 16.5 | 17.0 | 17.5 | 18.0 | 18.5 | 19.0 | 19.6 | 20.1 | 20.7 | 21.2 | 21.8 | 22.3 | 22.9 | 23.4 | 24.0 | 24.5 | | | | | | | 54 |
| | 55 | 15.6 | 16.1 | 16.6 | 17.1 | 17.6 | 18.2 | 18.7 | 19.3 | 19.9 | 20.4 | 20.9 | 21.5 | 22.0 | 22.6 | 23.1 | 23.7 | 24.2 | 24.8 | | | | | | 55 |
| | 56 | 15.1 | 15.6 | 16.2 | 16.7 | 17.2 | 17.8 | 18.4 | 18.9 | 19.5 | 20.1 | 20.6 | 21.2 | 21.7 | 22.2 | 22.8 | 23.3 | 23.9 | 24.4 | 25.0 | | | | | 56 |
| | 57 | 14.5 | 15.0 | 15.6 | 16.1 | 16.7 | 17.3 | 17.9 | 18.5 | 19.1 | 19.7 | 20.2 | 20.8 | 21.3 | 21.9 | 22.4 | 22.9 | 23.5 | 24.0 | 24.6 | 25.1 | | | | 57 |
| | 58 | 14.0 | 14.5 | 15.1 | 15.7 | 16.3 | 16.9 | 17.5 | 18.1 | 18.7 | 19.3 | 19.8 | 20.3 | 20.9 | 21.4 | 22.0 | 22.5 | 23.1 | 23.6 | 24.2 | 24.7 | 25.2 | | | 58 |
| | 59 | 13.4 | 13.9 | 14.5 | 15.1 | 15.7 | 16.3 | 17.0 | 17.6 | 18.2 | 18.8 | 19.3 | 19.9 | 20.4 | 21.0 | 21.5 | 22.0 | 22.6 | 23.1 | 23.7 | 24.2 | 24.8 | 25.3 | 25.9 | 59 |
| | 60 | | 13.6 | 14.1 | 14.7 | 15.3 | 15.9 | 16.5 | 17.1 | 17.7 | 18.3 | 18.8 | 19.4 | 19.9 | 20.4 | 21.0 | 21.5 | 22.1 | 22.6 | 23.2 | 23.7 | 24.2 | 24.8 | 25.3 | 60 |
| | 61 | | | 13.5 | 14.1 | 14.7 | 15.3 | 15.9 | 16.5 | 17.2 | 17.7 | 18.2 | 18.8 | 19.3 | 19.9 | 20.4 | 21.0 | 21.5 | 22.1 | 22.6 | 23.1 | 23.7 | 24.2 | 24.8 | 61 |
| | 62 | | | | 13.4 | 14.0 | 14.6 | 15.3 | 15.9 | 16.5 | 17.1 | 17.6 | 18.2 | 18.7 | 19.3 | 19.8 | 20.4 | 20.9 | 21.4 | 22.0 | 22.5 | 23.1 | 23.6 | 24.2 | 62 |
| | 63 | | | | | 13.2 | 13.9 | 14.5 | 15.2 | 15.9 | 16.4 | 17.0 | 17.5 | 18.1 | 18.6 | 19.2 | 19.7 | 20.2 | 20.8 | 21.3 | 21.9 | 22.4 | 23.0 | 23.5 | 63 |
| | 64 | | | | | | 13.3 | 13.9 | 14.5 | 15.2 | 15.7 | 16.3 | 16.8 | 17.4 | 17.9 | 18.5 | 19.0 | 19.5 | 20.1 | 20.6 | 21.2 | 21.7 | 22.3 | 22.8 | 64 |
| | 65 | | | | | | | 13.1 | 13.7 | 14.4 | 15.0 | 15.5 | 16.1 | 16.6 | 17.2 | 17.7 | 18.3 | 18.8 | 19.3 | 19.9 | 20.4 | 21.0 | 21.5 | 22.1 | 65 |
| | 66 | | | | | | | | 12.9 | 13.7 | 14.2 | 14.7 | 15.3 | 15.8 | 16.4 | 16.9 | 17.5 | 18.0 | 18.5 | 19.1 | 19.6 | 20.2 | 20.7 | 21.3 | 66 |
| | 67 | | | | | | | | | 12.8 | 13.4 | 13.9 | 14.4 | 15.0 | 15.5 | 16.1 | 16.6 | 17.2 | 17.7 | 18.3 | 18.8 | 19.3 | 19.9 | 20.4 | 67 |
| | 68 | | | | | | | | | | 12.5 | 13.0 | 13.6 | 14.1 | 14.7 | 15.2 | 15.7 | 16.3 | 16.8 | 17.4 | 17.9 | 18.5 | 19.0 | 19.5 | 68 |
| | 69 | | | | | | | | | | | 12.1 | 12.6 | 13.2 | 13.7 | 14.3 | 14.8 | 15.4 | 15.9 | 16.4 | 17.0 | 17.5 | 18.1 | 18.6 | 69 |
| | 70 | | | | | | | | | | | | 11.7 | 12.2 | 12.7 | 13.3 | 13.8 | 14.4 | 14.9 | 15.5 | 16.0 | 16.6 | 17.1 | 17.6 | 70 |
| | 71 | | | | | | | | | | | | | 11.2 | 11.7 | 12.3 | 12.8 | 13.4 | 13.9 | 14.4 | 15.0 | 15.5 | 16.1 | 16.6 | 71 |
| | 72 | | | | | | | | | | | | | | 10.7 | 11.2 | 11.7 | 12.3 | 12.8 | 13.4 | 13.9 | 14.5 | 15.0 | 15.6 | 72 |
| | 73 | | | | | | | | | | | | | | | 10.1 | 10.6 | 11.2 | 11.7 | 12.3 | 12.8 | 13.4 | 13.9 | 14.4 | 73 |
| | 74 | | | | | | | | | | | | | | | | 9.5 | 10.0 | 10.6 | 11.1 | 11.7 | 12.2 | 12.7 | 13.3 | 74 |
| | 75 | | | | | | | | | | | | | | | | | 8.8 | 9.4 | 9.9 | 10.4 | 11.0 | 11.5 | 12.1 | 75 |
| | 76 | | | | | | | | | | | | | | | | | | 8.1 | 8.7 | 9.2 | 9.7 | 10.3 | 10.8 | 76 |
| | | 62 | 63 | 64 | 65 | 66 | 67 | 68 | 69 | 70 | 71 | 72 | 73 | 74 | 75 | 76 | 77 | 78 | 79 | 80 | 81 | 82 | 83 | 84 | |
| | | Evaporator Entering Mixed-Air Drybulb Temperature, $t_m$ (°F) | | | | | | | | | | | | | | | | | | | | | | | |

*FIG. 11*

APPARATUS AND METHODS TO MEASURE ECONOMIZER OUTDOOR AIR FRACTIONS AND FAULT DETECTION DIAGNOSTICS OF AIRFLOW, COOLING CAPACITY, AND HEATING CAPACITY

BACKGROUND OF THE INVENTION

The present invention relates to Heating, Ventilating, and Air Conditioning (HVAC) systems and in particular to outdoor air introduced into buildings during HVAC operation through economizer outdoor air dampers or non-economizer outdoor air dampers.

Buildings are required to provide a minimum flow of outdoor air into their HVAC systems per the American Society of Heating Refrigeration and Air-Conditioning Engineers (ASHRAE) Standard 61.1 (ANSI/ASHRAE 62.1-2010. Standard Ventilation for Acceptable Indoor Air Quality) and the California Energy Commission (CEC) Building Energy Efficiency Standards for Residential and Nonresidential Buildings (CEC-400-2012-004-CMF-REV2). When the outdoor airflow exceeds the minimum required airflow, the additional airflow may introduce unnecessary hot outdoor air when the HVAC system is cooling the building, or introduce unnecessary cold outdoor air when the HVAC system is heating the building. This unnecessary or unintended outdoor airflow reduces space cooling and heating capacity and efficiency and increases cooling and heating energy consumption and the energy costs required to provide space cooling and heating to building occupants. Known methods for measuring the amount of outdoor airflow introduced into buildings to meet minimum requirements are inaccurate and better methods are required to improve thermal comfort of occupants, reduce cooling and heating energy usage, and improve cooling and heating energy efficiency.

U.S. Pat. No. 6,415,617 (Seem 2002) discloses a method for controlling an air-side economizer of an HVAC system using a model of the airflow through the system to estimate building cooling loads when minimum and maximum amounts of outdoor air are introduced into the building and uses the model and a one-dimensional optimization routine to determine the fraction of outdoor air that minimizes the load on the HVAC system. The '617 patent does not provide apparatus or methods to measure the Outdoor Air Fraction (OAF) defined as the ratio of outdoor airflow through the economizer or non-economizer dampers to total system airflow. Nor does the '617 patent provide methods to adjust the economizer outdoor air damper minimum damper position until OAF is within the allowable minimum regulatory requirement.

US Patent application publication No. 2015/0,309,120 (Bujak 2015) discloses a method to evaluate economizer damper fault detection for an HVAC system including moving dampers from a baseline position to a first damper position and measuring the fan motor output at both positions to determine successful movement of the baseline to first damper position. The '120 publication does not teach how to measure the OAF or electronically control the actuator to adjust the economizer outdoor air damper minimum damper position until OAF is within the allowable minimum regulatory requirement.

U.S. Pat. No. 7,444,251 (Nikovski 2008) discloses a system and method to detect and diagnose faults in HVAC equipment using internal state variables under external driving conditions using a locally weighted regression model and differences between measured and predicted state variables to determine a condition of the HVAC equipment. The '251 patent does not provide apparatus or methods to measure the OAF. The '251 patent does not provide apparatus or methods to measure the OAF. Nor does the '251 patent provide methods to adjust the economizer outdoor air damper minimum damper position until OAF is within the allowable minimum regulatory requirement or measure the temperature difference across the evaporator or heat exchanger to determine whether or not the sensible cooling or heating capacities are within tolerances.

U.S. Pat. No. 6,223,544 (Seem 2001) discloses an integrated control and fault detection system using a finite-state machine controller for an air handling system. The '544 method employs data regarding system performance in the current state and upon a transition occurring, determines whether a fault exists by comparing actual performance to a mathematical model of the system under non-steady-state operation. The '544 patent declares a fault condition in response to detecting an abrupt change in the residual which is a function of at least two temperature measurements including: outdoor-air, supply-air, return-air, and mixed-air temperatures. The '544 patent measures the mixed-air temperature with a single-sensor and without a minimum temperature difference between outdoor and return air temperatures. The '544 patent does not provide apparatus or accurate methods to measure the OAF. Nor does the '544 patent provide methods to adjust the economizer outdoor air damper minimum damper position until the OAF is within the allowable minimum regulatory requirement or measure the temperature difference across the evaporator or heat exchanger to determine whether or not the sensible cooling or heating capacities are within tolerances.

Thus, known methods and apparatus currently do not exist to accurately measure the outdoor airflow through economizer or non-economizer outdoor air dampers. The present invention provides an apparatus and method to accurately measure and establish the OAF to optimize economizer damper position either manually or automatically using an economizer fault detection diagnostic (FDD) controller and actuator to meet ASHRAE 62.1 minimum outdoor airflow requirements. Optimizing the OAF will improve space cooling and heating efficiency, save energy, and reduce carbon dioxide emissions.

BRIEF SUMMARY OF THE INVENTION

The present invention addresses the above and other needs by providing a method for determining the Outdoor Air Fraction (OAF), (the ratio of outdoor airflow through the economizer or non-economizer outdoor air dampers (i.e., louvers) and/or cabinet, to the total airflow introduced into the air conditioner evaporator or heat exchanger) and the mixed-air humidity ratio and mixed-air wetbulb temperature, for packaged and split-system HVAC equipment equipped with economizer or non-economizer outdoor air dampers. An outdoor airflow exceeding the American Society of Heating Refrigeration and Air-Conditioning Engineers (ASHRAE) Standard 62.1 Ventilation for Acceptable Indoor Air Quality hereinafter referred to as ASHRAE Standard 62.1 minimum outdoor air requirements wastes space cooling and heating energy and increases carbon dioxide emissions contributing to global warming. The OAF measurements are used to optimize the minimum economizer or non-economizer outdoor air damper position to meet but not exceed ASHRAE 62.1 minimum outdoor airflow requirements. The present invention provides a method to measure OAF versus damper actuator voltage at the initial damper position, fully-open-damper maximum damper position, and closed-damper position. The present invention uses these measurements and matrix algebra to calculate coefficients for a quadratic regression equation of OAF versus control voltage in order to establish the optimal economizer damper position actuator control voltage to adjust the damper to achieve the optimally minimum OAF to just meet outdoor airflow requirements per ASHRAE Standard 62.1 to reduce over ventilation and save energy. After the economizer damper position is verified to be within the accepted tolerance of the required minimum $OAF_r$ per ASHRAE Standard 62.1, the mixed-air wetbulb temperature is determined to measure evaporator entering air drybulb and wetbulb temperatures and supply air drybulb temperature to evaluate temperature split, sensible cooling or heating capacity, and refrigerant charge Fault Detection Diagnostics (FDD) in order to determine whether or not the evaporator airflow, sensible cooling or heating capacity, and refrigerant charge of the air conditioning system, needs to be adjusted or corrected.

In accordance with one aspect of the invention, there is provided a method for accurately measuring mixed air temperature by positioning an averaging temperature sensor in the passage between the mixed air chamber of the HVAC system and the air conditioner evaporator and furnace/heat exchanger of the HVAC system. The averaging temperature sensor is preferably formed into a quasi-rectangular or quasi-circular spiral in the shape of the passage in order to measure the average temperature of air flowing through the mixed-air chamber from the return duct and the outdoor air dampers. The mixed-air drybulb temperature measurement is considered accurate when the difference between return drybulb temperature and outdoor air drybulb temperature is preferably at least 10 degrees Fahrenheit and more preferably at least 20 degrees Fahrenheit. OAF measurements made at lower temperature differences will have slightly lower accuracy.

In accordance with another aspect of the invention, there is provided a method for recursively computing mixed air humidity ratio $W^*_s$. An initial value of mixed air wetbulb temperature $t^*_m$ is made based on a drybulb temperature measurement. A saturation pressure at wetbulb temperature $p_{ws}$ is computed using the estimate of $t^*_m$. An updated value of $W^*_s$ is computed from $p_{ws}$. The process is repeated using updated value of $W^*_s$ until it converges.

In accordance with yet another aspect of the invention, there is provided a method for measuring the sensible temperature split across the evaporator in cooling mode or the sensible temperature rise across the heat exchanger in heating mode. The sensible temperature split for cooling, or for temperature rise for heating, can be used to evaluate over ventilation, airflow, sensible cooling capacity, sensible heating capacity, and/or refrigerant charge FDD information.

In accordance with still another aspect of the invention, there is provided a method to use sensors to transmit temperature or humidity measurement data using wires or wirelessly to a device or controller in order to display, store, or use the data to measure the OAF or to provide measurement data to an economizer controller or outdoor air damper controller where the controller uses the data to calculate the measured OAF and compares the measured OAF to a minimum outdoor airflow specification for a building conditioned space and occupancy, and communicates a low-voltage signal to an actuator to energize the actuator to adjust the damper position to establish an optimally minimum damper position to provide an OAF within tolerances of the minimum outdoor airflow based on regulatory requirements for a building conditioned space and occupancy.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 9 provides a chart showing the OAF versus economizer damper actuator control voltage on an HVAC system according to the present invention.

FIG. 10 shows a chart of damper position data, and equations 7, 9, 11, and 19, according to the present invention.

FIG. 11 shows a lookup table for calculating the target temperature split difference ($\delta T_t$) based on the evaporator entering mixed-air drybulb temperature, $t_m$, and evaporator entering mixed-air wetbulb temperature, $t^*_m$, according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement. Drybulb temperature measurements at indicated without asterisks and corresponding wetbulb temperatures are indicated by the addition of an asterisk.

Figure 1:
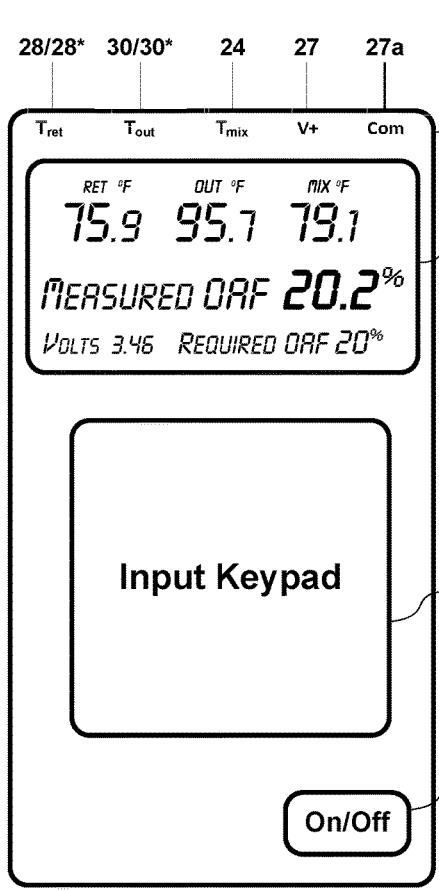
FIG. 1 shows a portable (for example, hand held) apparatus for measuring the outdoor air fraction (OAF) through economizer outdoor air dampers or manual outdoor air dampers.
Figure 2:
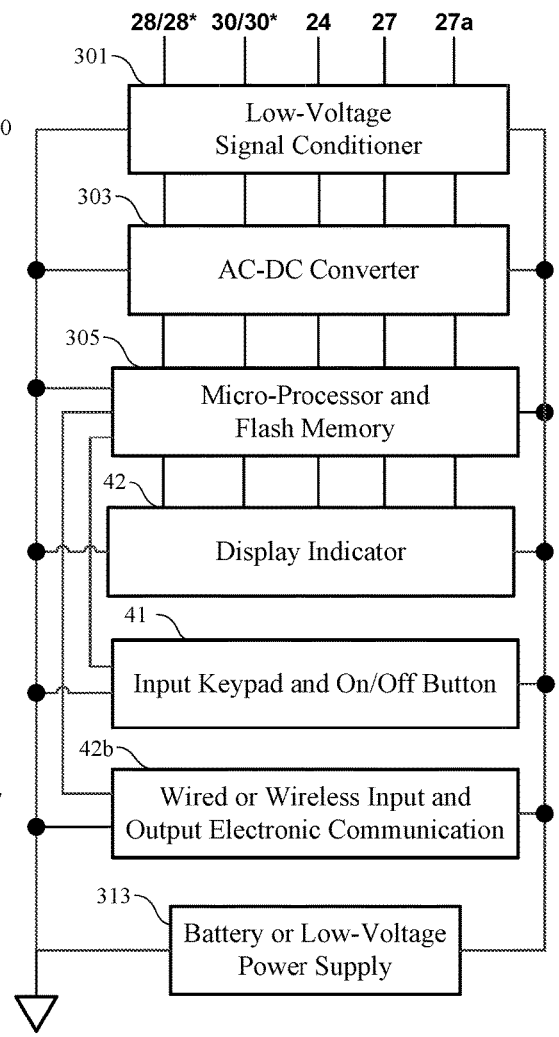
FIG. 2 shows the electronic components of a portable measurement instrument or control device mounted to an HVAC system for measuring OAF or evaluating HVAC FDD.
Figure 3:
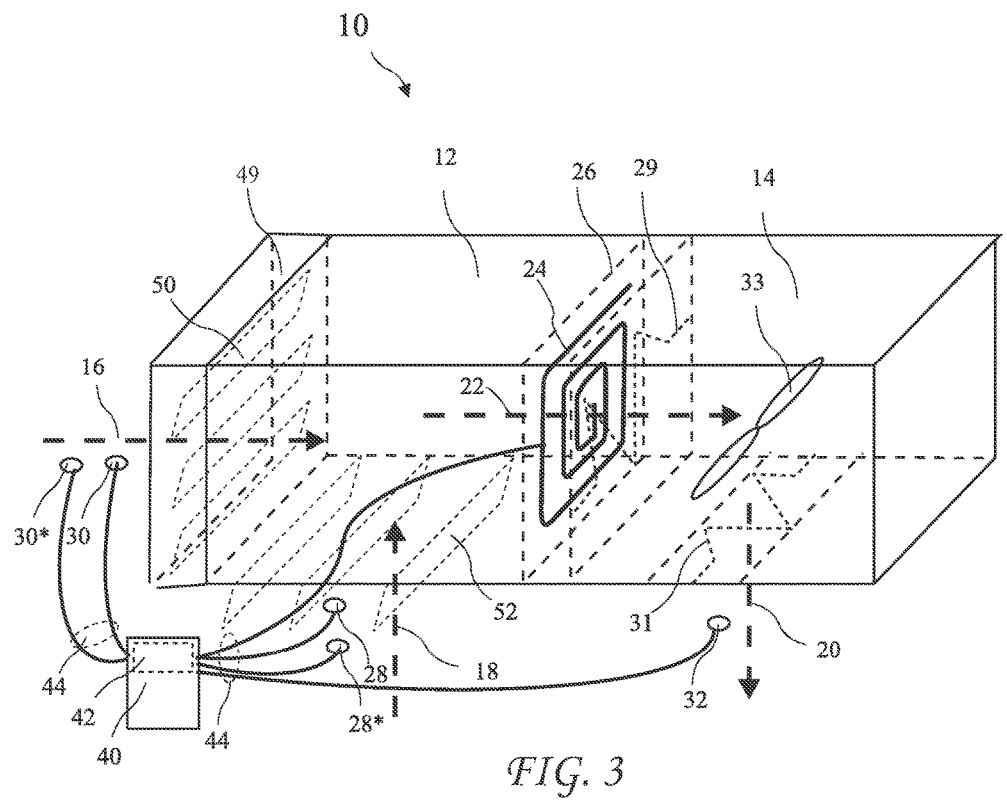
FIG. 3 shows an air handler of a Heating, Ventilation, and Air Conditioning (HVAC) system with manually adjusted outdoor air dampers according to the present invention with measurement instrument or controller capable of receiving measurements using either wired connections or wirelessly.
Figure 5:
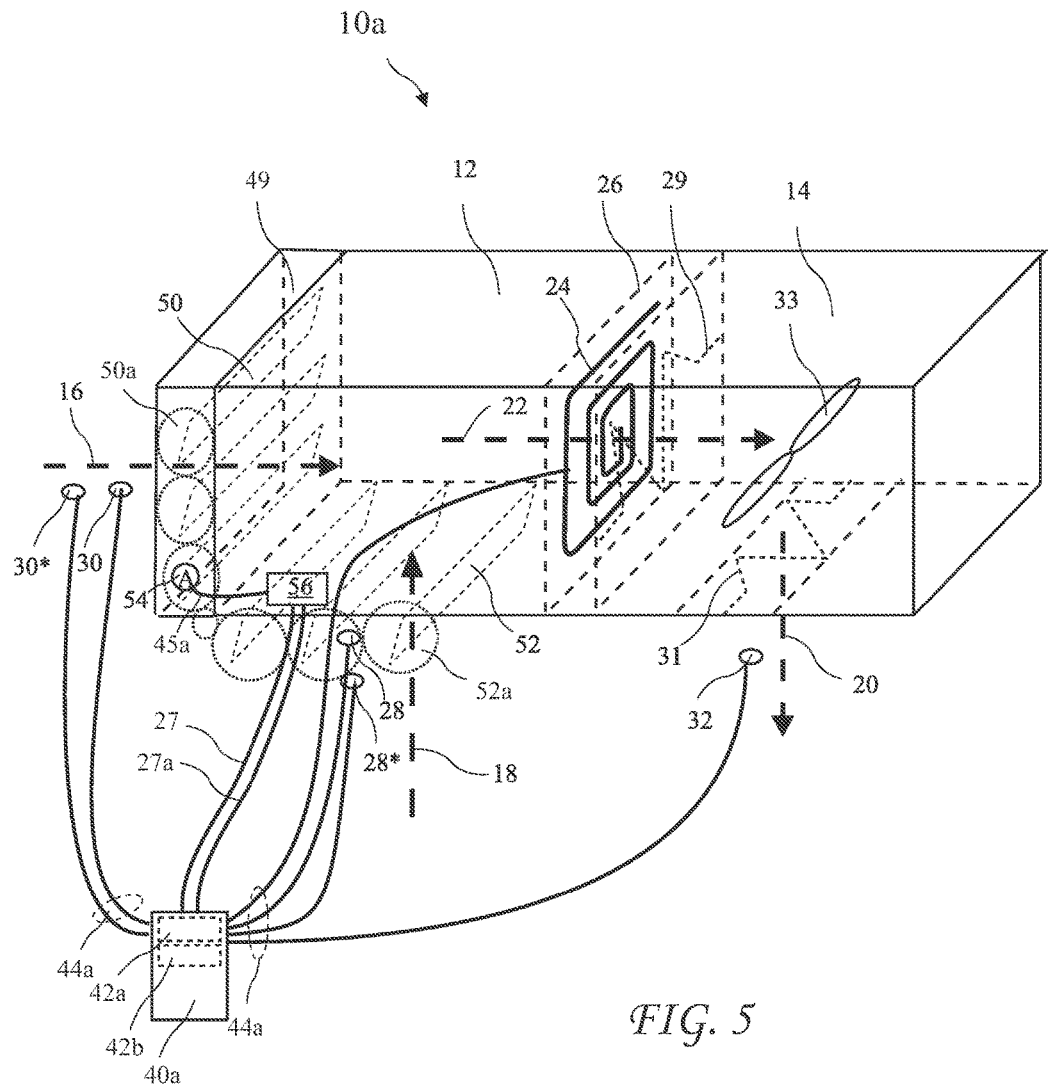
FIG. 5 shows the air handler of an HVAC system with an economizer controller and actuator used to adjust outdoor air dampers according to the present invention with measurement instrument or controller capable of receiving measurements using either wired connections or wirelessly.
Figure 6:
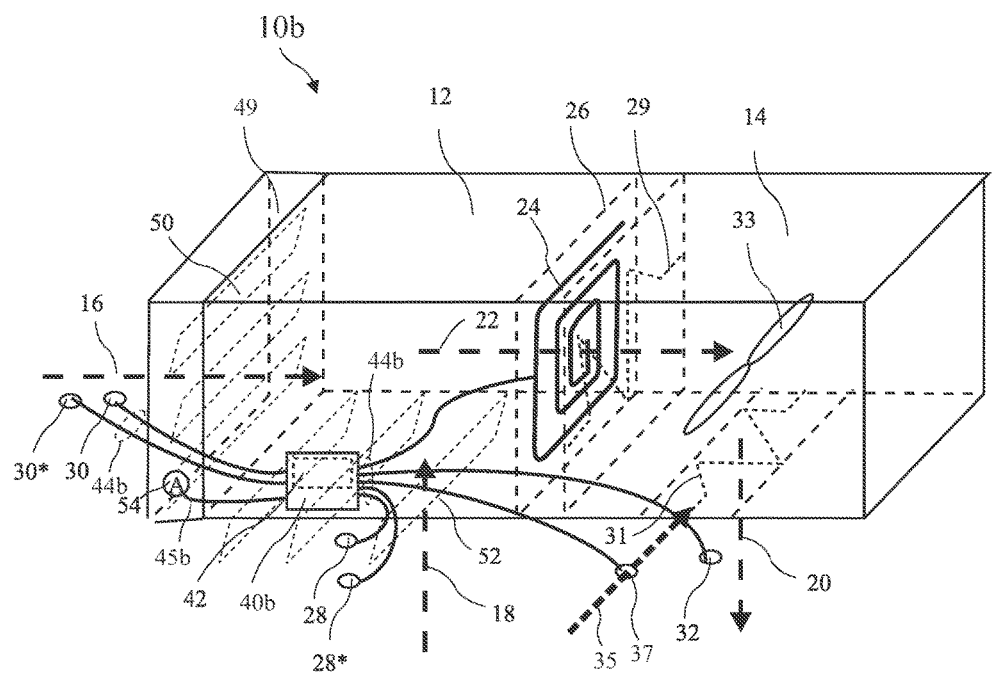
FIG. 6 shows the air handler of an HVAC system with an economizer controller and actuator used to adjust outdoor air dampers according to the present invention with measurement instrument or controller mounted on the HVAC hardware.

FIG. 1 shows a handheld measurement device 40 and FIG. 2 shows the electronic components of measurement devices 40, 40a or 40b (see FIGS. 3, 5 and 6). The measurement devices 40, 40a and 40b preferably include a low-voltage power supply or external power source 313, a signal conditioner 301, an ac-dc converter 303, microprocessor with flash memory 305, wireless communication electronic technology 42b, and a display 42 or 42a for receiving, processing, transmitting and displaying measurements from temperature sensors 24, 28, 28*, 30, 30*, and 32, and voltage 27 (see FIGS. 3, 5 and 6). The measurement device 40 may also provide an input keypad 41 to enter the required $OAF_r$ or other data, and a battery or a low-voltage power supply 313. The measurement devices 40a and 40b may also provide a low-voltage input 27 and a common input 27a to measure damper actuator voltage for controlling the position of outdoor air dampers (i.e., louvers) 50 and return air dampers (i.e., louvers) 52 shown in FIGS. 5 and 6.

Figure 4:
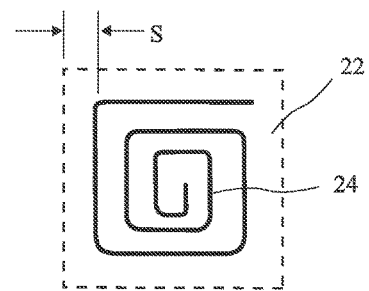
FIG. 4 shows an averaging temperature sensor formed into a quasi-rectangular or quasi-circular spiral in the shape of the passage according to the present invention.

An air handler 10 of a packaged Heating, Ventilation, Air Conditioning (HVAC) system with manually adjusted outdoor air dampers (i.e., louvers) 50 is shown in FIG. 3, and an averaging temperature sensor 24 is shown in FIG. 4 formed into a quasi-rectangular or quasi-circular spiral in the shape of the mixed-air passage 22. A flow of outdoor air 16 enters a mixed air chamber 12 of the air handler 10 through adjustable outdoor air dampers (i.e., louvers) 50. A flow of return air 18 enters a mixed air chamber 12 of the air handler 10 through adjustable return air dampers (i.e., louvers) 52. The outdoor air flow and return air flow combine in a mixed air flow 22 that flows through an air filter 26 and evaporator 29, and into a chamber 14 containing a draw-through blower fan 33 and gas or electric heat exchanger 31. A flow of heated or cooled air 20 is then provided through supply ducts to the conditioned space. The averaging temperature sensor 24 is located on the inlet side of the air filter 26 adjacent to the evaporator 29 of the mixed air passage. The averaging temperature sensor 24 is generally perpendicular to the path of mixed airflow 22, on the inlet of air filter and upstream of the evaporator 29, blower fan 33 and heat exchanger 31. The averaging temperature sensor 24 is used to measure the mixed-air drybulb temperature $t_m$.

The outdoor air dampers 50 and return air dampers 52 are coupled by a gear assembly so when outdoor air dampers 50 are opened, the return air dampers 52 close, and vice versa. Closing the outdoor air dampers 50 reduces the volumetric airflow rate of the outdoor air 16 into the mixed air chamber 12 and opens the dampers 52 to increase the volumetric airflow rate of return air 18 into the mixed air chamber 12. Preferably, the positions of the dampers 50 and the dampers 52 are coupled by the gear assemblies 50a and 52a so that opening the dampers 50 closes the dampers 52, and opening the dampers 52 closes the dampers 50, to maintain a generally consistent volumetric airflow rate into the mixed air chamber 12.

The temperature sensor 28 measures the return air drybulb temperature, $t_r$, and temperature sensor 30 measures the outdoor air drybulb temperature $t_o$. The temperature sensor 32 is used to measure the supply air drybulb temperature $t_s$, used with the return air drybulb or mixed air drybulb to calculate the temperature split decrease across the evaporator in cooling mode or the temperature split increase across the heat exchanger in heating mode. The mixed-air drybulb temperature, $t_m$, measurement is considered minimally accurate when the difference between return drybulb temperature, $t_r$, and outdoor air drybulb temperature, $t_o$, is preferably at least ten degrees Fahrenheit and is considered more accurate when the difference between return drybulb temperature, $t_r$, and outdoor air drybulb temperature, $t_o$, is at least 20 degrees Fahrenheit. The measurement device 40 (see FIG. 1) is connected to the sensors 24, 28, 30, and 32 by cables 44, or wirelessly communicates with the sensors 24, 28, 30, and 32. When the air handler 10 includes an actuator A to adjust outdoor air dampers 50 and return dampers 52 (see FIG. 5), the measurement device 40 may also provide low-voltage inputs to measure damper actuator voltage for controlling the position of outdoor air dampers 50 and return dampers 52.

The return air drybulb temperature $t_r$, and the return air wetbulb temperature $t*_r$, are preferably measured in well-mixed return air. The outdoor air drybulb temperature $t_o$ and outdoor air wetbulb temperature $t*_o$ are preferably measured in well-mixed outdoor air entering an economizer 49 controlling the outdoor air flow 16b into the mixed air chamber 12 through outdoor air dampers 50.

The averaging temperature sensor 24 shown in FIG. 4 is preferably a Resistance Temperature Detector (RTD) or thermistor or thermocouple sensor, preferably formed into a quasi-rectangular or quasi-circular spiral in the shape of the in the shape of the mixed-air passage 22 or the mixed-air chamber 12. The averaging temperature sensor 24 may further be an infrared averaging sensor or temperature sensor array consisting of one or more RTD, thermistors, or thermocouple sensors used to measure the mixed air drybulb temperature, $t_m$.

An air handler 10a of a packaged HVAC system with an economizer controller 56 and actuator 54 used to adjust outdoor air dampers is shown in FIG. 5. The flow of outdoor air 16 enters the mixed air chamber 12 of the air handler 10 through the adjustable dampers 50. The flow of return air 18 enters the mixed air chamber 12 of the air handler 10 through the adjustable dampers 52. The outdoor air flow and return air flow combine in the mixed air flow 22 that flows through the air filter 26 and the evaporator 29, and into the chamber 14 containing the draw-through blower fan 33 and the gas or the electric heat exchanger 31. The flow of heated or cooled air 20 is then provided through supply ducts to the conditioned space. The averaging temperature sensor 24 is located on the inlet side of the air filter 26 adjacent to the evaporator 29 of the mixed air passage. The averaging temperature sensor 24 is generally perpendicular to the path of mixed airflow 22, on the inlet of air filter and upstream of the evaporator 29, blower fan 33 and heat exchanger 31. The averaging temperature sensor 24 is used to measure the mixed-air drybulb temperature $t_m$.

FIG. 5 shows outdoor air dampers 50 and return air dampers 52 controlled and coupled by a gear assembly 50a, 52a and actuator 54 so when outdoor air dampers 50 are opened by the actuator, the return air dampers 52 close, and vice versa. The actuator 54 is controlled by a controller 56 using a voltage signal carried by a cable 45a and measured by the hand held measurement device 40a using a low-voltage sensor 27 and ground probe 27a. Closing the outdoor air dampers 50 reduces the volumetric airflow rate of the outdoor air 16 into the mixed air chamber 12 and opens the dampers 52 to increase the volumetric airflow rate of return air 18 into the mixed air chamber 12. Preferably, the positions of the dampers 50 and the dampers 52 are controlled and coupled by the gear assembly 50a, 52a so that opening the dampers 50 closes the dampers 52, and opening the dampers 52 closes the dampers 50, to maintain a generally consistent volumetric airflow rate into the mixed air chamber 12.

The sensor 28 measures the return air drybulb temperature, $t_r$, and the optional temperature sensor 28* measures the return air wetbulb temperature, $t^*_r$, respectfully. The temperature sensor 30 measures the outdoor air drybulb temperature, $t_o$, and the optional temperature sensor 30* measures the outdoor air wetbulb temperature, $t^*_o$, respectively. The temperature sensor 32 is used to measure the supply air drybulb temperature, $t_s$, used with the return air drybulb or mixed air drybulb to calculate the temperature split decrease across the evaporator in cooling mode or the temperature split increase across the heat exchanger in heating mode. The mixed-air drybulb temperature, $t_m$, measurement is considered minimally accurate when the difference between return drybulb temperature, $t_r$, and outdoor air drybulb temperature, $t_o$, is preferably at least ten degrees Fahrenheit and considered more accurate when the difference between return drybulb temperature, $t_r$, and outdoor air drybulb temperature, $t_o$, is at least 20 degrees Fahrenheit. FIG. 5 shows a portable (for example, hand held) measurement device 40a. The measurement device 40a is connected to the temperature sensors 24, 28, 28*, 30, 30*, and 32 by cables 44, or wirelessly communicate with the sensors temperature 24, 28, 28*, 30, 30*, and 32.

An air handler of a HVAC system 10b and including a measurement instrument or control device 40b mounted to an HVAC system 10b is shown in FIG. 6. The controller device 40b may be connected to the temperature sensors 24, 28, 28*, 30, 30*, and 32 by cables 44, or may wirelessly communicate with the temperature sensors 24, 28, 28*, 30, 30*, and 32, and is connected to the actuator 54 by the cable 44b to control the dampers 50 and 52 using a voltage signal. The measurement and controller device 40b preferably includes a low-voltage power supply or external power source, signal conditioner, microprocessor, wireless communication electronic technology 42b, and display 42a for receiving, processing, transmitting and displaying measurements from the temperature sensors 24, 28, 28*, 30, 30*, and 32.

The measurement device 40b may also provide low-voltage outputs to control the actuator A for controlling the position of outdoor air dampers 50 and return dampers 52. The measurement device 40b may also be wired or wireless and provide economizer damper position and Outdoor Air Flow (OAF) measurements and operational Fault Detection Diagnostic (FDD) signals through a built-in display or external display through wireless communication signals to a building energy management system, standard thermostat, WIFI-enabled thermostat, internet-connected computer, internet telephony system, or smart phone indicating maintenance requirements to check and correct outdoor air damper position, evaporator airflow and/or refrigerant charge of the air conditioning system.

Figure 14:
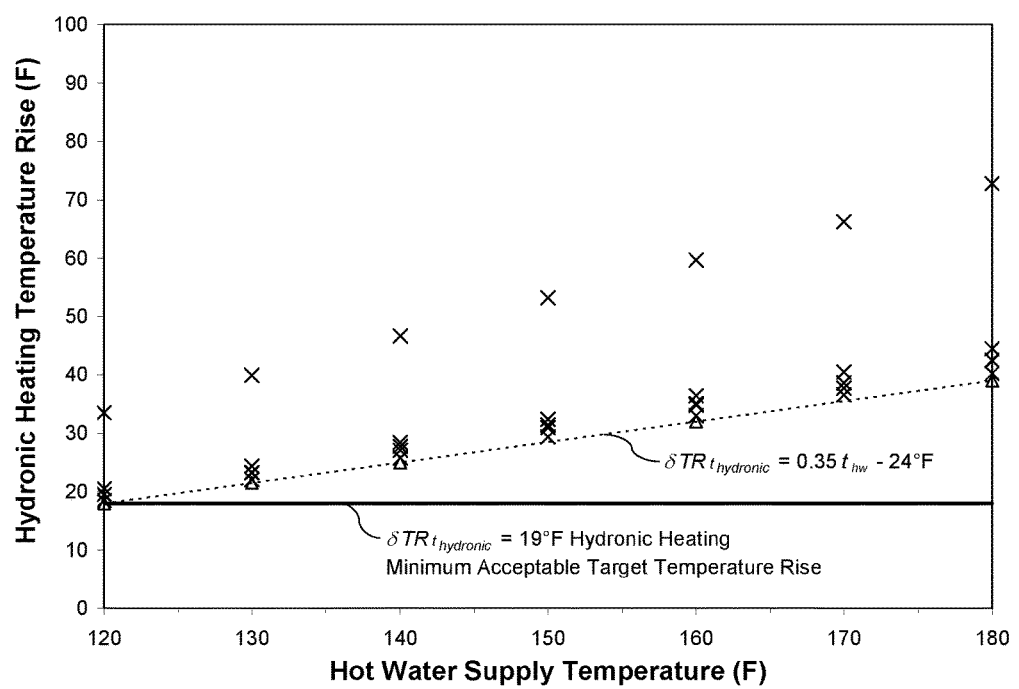
FIG. 14 shows a chart of hydronic heating coil manufacturer minimum acceptable temperature rise versus hot water temperature for 35 models.

FIG. 6 further shows an optional temperature sensor 37 which may be used to measure the inlet hot water supply 35 temperature for a hydronic heating system for calculating target temperature rise using the hydronic heating minimum acceptable target temperature rise equation shown in FIG. 14. Other than including the measurement and controller device 40b mounted to the HVAC system 10b and the optional temperature sensor 37 and the inlet hot water supply 35, the HVAC system 10b shares the features of the HVAC system 10a described in FIG. 5.

Figure 7:
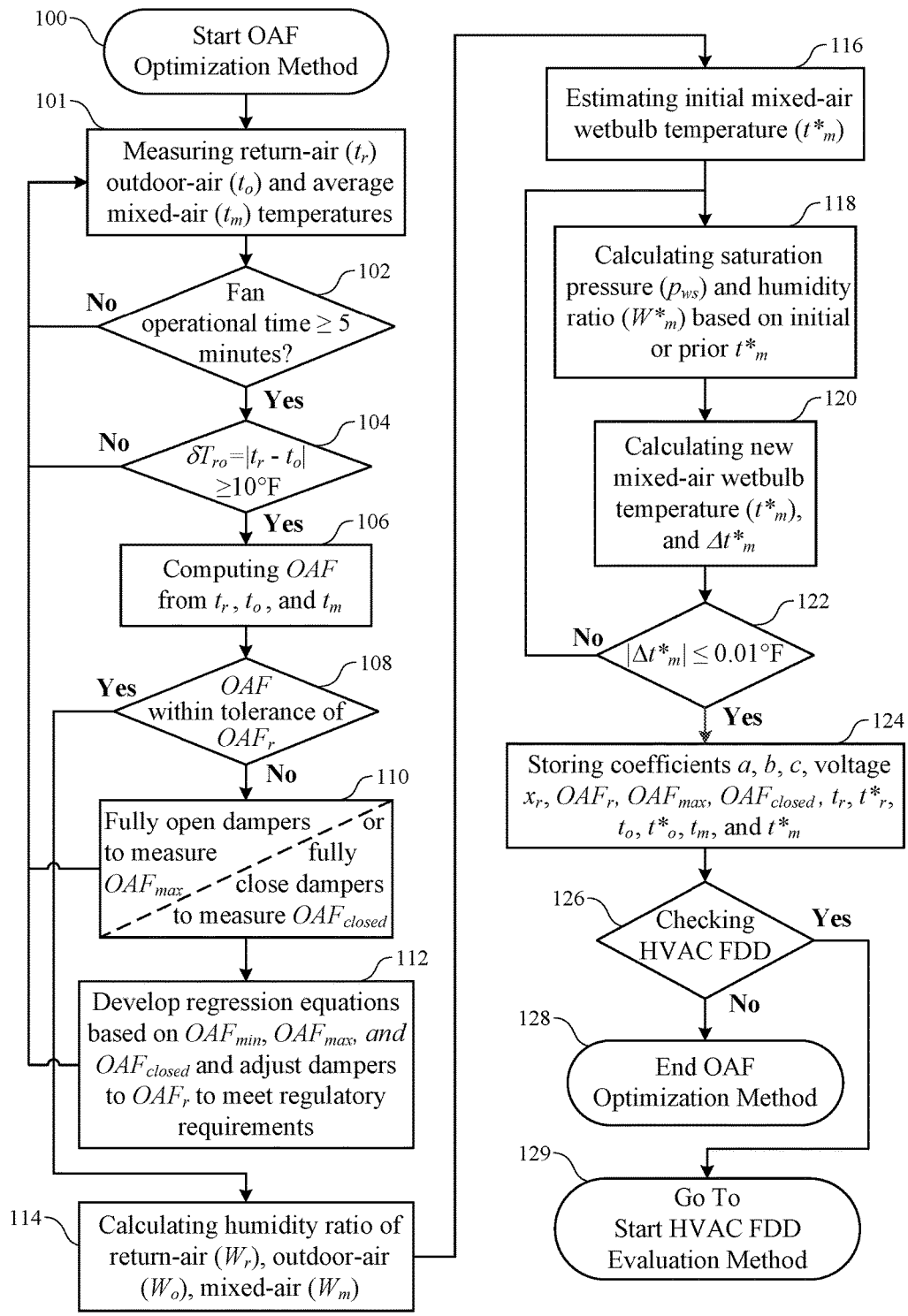
FIG. 7 shows a method for OAF optimization on an HVAC system while the HVAC system is operating, according to the present invention.

FIG. 7 shows a method for optimizing OAF on an HVAC system while the HVAC system is operating according to the present invention. The method includes starting the optimization at step 100, measuring return air temperature $t_r$, outdoor air temperature $t_o$, and mixed air temperature $t_m$ at step 101, and waiting for at least 5 minutes for sensors to measure air temperature at step 102. If the fan operational time is less than 5 minutes, then the method includes continuing to loop through step 101 to measure air temperatures until the fan has operated for at least 5 minutes according to step 102.

After 5 minutes of fan operational time, the method includes checking if the absolute value of the return-air minus outdoor-air temperature difference, $\delta T_{ro}$, is greater than a minimum temperature difference, preferably 10 degrees Fahrenheit, at step 104 according to the following equation.

$$\delta T_{ro} = |t_r - t_o| \geq 10 \qquad \text{Eq. 1}$$

Where, $\delta T_{ro}$=absolute value of the return-air minus outdoor-air drybulb temperatures (F),
$t_r$=return-air drybulb temperature (F), and
$t_o$=outdoor-air drybulb temperature (F).

If the absolute value of the return-air minus outdoor-air temperature difference is not greater than 10 degrees Fahrenheit, then the method loops back to step 100.

If the temperature difference is greater than 10 degrees Fahrenheit, then the method includes computing the Outdoor Air Fraction (OAF) from $t_r$, $t_o$ and $t_m$ at step 106 using the following equation.

$$OAF = \frac{t_r - t_m}{t_r - t_o} \qquad \text{Eq. 3}$$

Where, OAF=outdoor air fraction (dimensionless),
$t_m$=mixed-air drybulb temperature (F).

The method may be implemented manually on units without a damper actuator. The method may be further implemented on units with an analog economizer controller with temperature sensors and low-voltage output signals to measure, adjust and correct the OAF using a damper actuator. The method may be further implemented on units with a digital economizer controller with microprocessor with FDD capabilities, temperature sensors and low-voltage output signals to control a damper actuator, and low-voltage output actuator control signals to measure, adjust and correct the OAF using a damper actuator and evaluate low airflow, low cooling capacity or low heating capacity. The controller may be able to take temperature measurements at specific initial, maximum, and closed economizer damper actuator control voltages, and use this information to calculate regression equation coefficients for the OAF versus economizer damper actuator voltage and with use the target minimum OAF based on regulatory requirements with the regression equation to solve for the optimal actuator voltage to achieve the target minimum OAF using the quadratic formula, and adjust the economizer dampers as necessary to achieve the optimally minimum OAF and then measure the OAF to verify the optimally minimum OAF is within an accepted tolerance of the minimum $OAF_r$ based on regulatory requirements for the building and occupancy. A preferred accepted tolerance is within plus or minus ten percent of the minimum $OAF_r$ based on regulatory requirements for the building and occupancy.

At step 108, the method includes checking the measured outdoor air fraction (OAF) to determine whether or not it is within ten percent of the minimum required outdoor air fraction ($OAF_r$) based on regulatory standards.

$$0.9 \times OAF_r \leq OAF \leq 1.1 \times OAF_r \qquad \text{Eq. 5}$$

At step 110, the method includes fully opening the economizer dampers and looping back to step 100 and measuring $t_r$, $t_o$ and $t_m$ at the maximum damper position and computing and storing the maximum Outdoor Air Fraction ($OAF_{max}$) based on $t_r$, $t_o$ and $t_m$ at step 106 using Equation 2. For an HVAC system with an economizer damper actuator, opening the dampers involves adjusting the damper actuator control voltage to the maximum voltage, typically 10V, and looping back to step 100 and measuring $t_r$, $t_o$ and $t_m$ at the maximum damper position and computing and storing the maximum Outdoor Air Fraction ($OAF_{max}$) based on $t_r$, $t_o$ and $t_m$ at step 106 using Equation 2.

Repeating step 110, the method includes fully closing the economizer dampers and looping back to step 100 and measuring $t_r$, $t_o$ and $t_m$ at the closed damper position and computing and storing the closed Outdoor Air Fraction ($OAF_{closed}$) based on $t_r$, $t_o$ and $t_m$ at step 106 using Equation 2. For an HVAC system with an economizer damper actuator, closing the dampers involves adjusting the damper actuator control voltage to the minimum voltage, typically 2V, and looping back to step 100 and measuring $t_r$, $t_o$ and $t_m$ at the closed damper position and computing and storing the closed Outdoor Air Fraction ($OAF_{closed}$) based on $t_r$, $t_o$ and $t_m$ at step 106 using Equation 2.

At step 112, the present invention method includes developing the regression equations used to adjust the damper position to the optimize Outdoor Air Fraction ($OAF_o$) to meet regulatory requirements per the following equations.

$$y_i = ax_i^2 + bx_i + c \qquad \text{Eq. 7}$$

Where, $y_i$=outdoor air fraction (OAF) based on economizer damper position (dimensionless),
 $x_i$=economizer damper position or control voltage varying from 2V closed to 10V fully open (Volts),
 a=regression coefficient,
 b=regression coefficient, and
 c=regression coefficient.

The regression equation coefficients are calculated using a least square method based on measuring OAF at the initial, maximum, and closed damper position at the economizer actuator control voltages for each damper position using the following matrix equations for the quadratic regression.

$$\underbrace{\begin{bmatrix} \sum x_i^4 & \sum x_i^3 & \sum x_i^2 \\ \sum x_i^3 & \sum x_i^2 & \sum x_i \\ \sum x_i^2 & \sum x_i & n \end{bmatrix}}_{X} \underbrace{\begin{bmatrix} a \\ b \\ c \end{bmatrix}}_{C} = \underbrace{\begin{bmatrix} \sum x_i^2 y_i \\ \sum x_i y_i \\ \sum y_i \end{bmatrix}}_{Y} \qquad \text{Eq. 9}$$

The method includes solving the above equation based on three OAF measurements at the initial, maximum, and closed damper positions by multiplying the inverse of the 3×3 matrix A times 1×3 matrix C to obtain the coefficients of the quadratic regression using the following equation.

$$C = X^{-1} Y \qquad \text{Eq. 11}$$

Where, $X^{-1}$=inverse of the 3×3 matrix X calculated according to the following equation,
 C=1×3 matrix C containing coefficients, a, b, and c of the quadratic regression equation, and
 Y=1×3 matrix Y noted in the above equation.

The method includes solving the inverse of the 3×3 matrix X using the following equations.

$$X = \begin{bmatrix} h & k & n \\ i & l & o \\ j & m & p \end{bmatrix} \qquad \text{Eq. 13}$$

$$X^{-1} = \frac{1}{\det X} \begin{bmatrix} lb-om & nm-kp & ko-nl \\ oj-ip & hp-ni & ni-ho \\ im-lj & kj-hm & hl-ki \end{bmatrix} \qquad \text{Eq. 15}$$

$$\frac{1}{\det X} = \frac{1}{hlp - imn + jko - hmo - jln - ikp} \qquad \text{Eq. 17}$$

Where, detX=determinant of matrix X which cannot equal zero.

After calculating the 1×3 matrix C coefficients a, b, and c, using the above equations, the method includes calculating the position or control voltage, $x_r$, required for economizer dampers to achieve the required minimum $OAF_r$, to meet regulatory requirements using the following quadratic formula.

$$x_r = \frac{-b + \sqrt{b^2 - 4a(c - OAF_r)}}{2a} \qquad \text{Eq. 19}$$

Where, $OAF_r$=the required minimum $OAF_r$, to meet regulatory requirements, and
 $x_r$=the economizer actuator control voltage setting to achieve the required minimum $OAF_r$, to meet regulatory requirements.

After step 112, the present invention includes looping back to step 100 and measuring $t_r$, $t_o$, and $t_m$, computing final OAF in step 106, and checking whether or not the OAF is within acceptable tolerance of preferably ten percent of $OAF_r$ in step 108.

FIG. 9 provides a graph showing measurements of outdoor air fraction (OAF) versus economizer damper actuator position control voltage from closed to maximum open on an HVAC system according to the present invention. The economizer damper control voltage is determined using measurements of initial, maximum, and closed damper OAF and voltage. FIG. 10 illustrates how measurement data are used in a least squares method to determine coefficients of the quadratic regression Eq. 7. FIG. 10 provides a table of OAF measurements ($y_i$) based on damper actuator voltage ($x_i$). FIG. 10 shows measurement data entered into matrix X and matrix Y in Eq. 9. FIG. 10 shows the inverse matrix X is multiplied by matrix Y to calculate the matrix C quadratic regression coefficients in Eq. 11. FIG. 10 shows how the quadratic formula is used with the required minimum $OAF_r$ per regulatory requirements to calculate the required damper actuator control voltage $x_r$ in Eq. 19. The required damper actuator control voltage ($x_r$) is used to adjust the dampers, and the outdoor air fraction is measured per step 100 through step 106 of FIG. 7 to verify that the new OAF is preferably within an acceptable tolerance of the minimum allowable $OAF_r$ per regulatory requirements per step 108. Preferably, the optimization is performed when the difference between outdoor-air temperature and return-air temperature is at least 10 degrees Fahrenheit and more preferably at least 20 degrees Fahrenheit.

FIG. 11 illustrates the lookup table for calculating the target temperature split difference ($\delta T_t$) where the independent variables are the evaporator entering mixed-air drybulb temperature, $t_m$, and evaporator entering mixed-air wetbulb temperature, $t^*_m$, and the dependent variable is the target temperature split difference ($\delta T_t$).

The HVAC manufacturer protocols or regulatory standards require accurate measurement of mixed-air drybulb, $t_m$, and mixed-air wetbulb, $t^*_m$, entering the evaporator in order to lookup the required or target temperature difference across the evaporator (defined as the difference between mixed-air drybulb, $t_m$, minus supply-air drybulb, $t_s$, temperature) to diagnose and correct improper evaporator airflow or low cooling capacity. Low airflow can cause ice to form on the air filter and evaporator which blocks airflow and reduces cooling capacity and efficiency. Low cooling capacity can be caused by many faults including excess outdoor airflow, dirty or blocked air filters, blocked evaporator caused by dirt or ice buildup, blocked condenser coils caused by dirt or debris buildup, low refrigerant charge, high refrigerant charge, refrigerant restrictions, and non-condensable air or water vapor in the refrigerant system.

The HVAC manufacturer protocols or regulatory standards also require accurate measurement of mixed-air drybulb, $t_m$, and mixed-air wetbulb, $t^*_m$, entering the evaporator in order to lookup the required or target superheat (defined as the difference between refrigerant suction temperature and evaporator saturation temperature) in order to diagnose and correct refrigerant charge or other faults which can cause improper superheat outside published tolerances established by the manufacturer or regulatory agency. Superheat must be within published tolerances in order to maintain proper cooling capacity and efficiency and prevent liquid refrigerant from entering and damaging the refrigerant system compressor. Not having a method to accurately measure mixed-air drybulb, $t_m$, or wetbulb, $t^*_m$, will cause improper airflow and refrigerant system FDD as well as improper setup and operation of economizers and economizer FDD systems required by regulatory agencies.

Calculating the humidity ratios (lbm/lbm) of return-air $W_r$, outdoor-air, $W_o$ and mixed-air $W_m$ in step 114 are preferably performed using the following equations based on the Hyland Wexler formulas from the 2013 ASHRAE Handbook.

$$p1_{ws}=\text{EXP}[C_1/t^*_r+C_2+C_3 t^*_r+C_4 t^{*2}_r+C_5 t^{*3}_r+C_6 \ln(t^*_r)] \quad \text{Eq. 21}$$

Where, $p1_{ws}$=saturation pressure at wetbulb temperature (psia) for the return air.

$t^*_r$=measured return air wetbulb temperature+459.67 (R)

$C_1$=-1.0440397 E+04, $C_2$=-1.1294650 E+01, $C_3$=-2.7022355 E-02, $C_4$=1.2890360 E-05, $C_5$=-2.4780681 E-09, $C_6$=6.5459673 E+00, and $$W^*_r = 0.621945\left[\frac{p1_{ws}}{p_a - p1_{ws}}\right] \quad \text{Eq. 23}$$

Where, $W^*_r$=humidity ratio corresponding to saturation at the return air wetbulb temperature, $t^*_r$ (lbm/lbm), $p_a$=ambient air pressure (psia), and $$W_r = \frac{(1093 - 0.556 t^*_r) W^*_r - 0.24(t_r - t^*_r)}{(1093 + 0.444 t_r - t^*_r)} \quad \text{Eq. 25}$$

Where, $W_r$=return air humidity ratio (lbm/lbm).

Computing humidity ratio of outdoor air $W_o$ (lbm/lbm) at step 114 is preferably performed using the following equations:

$$p2_{ws}=\text{EXP}[C_1/t^*_o+C_2+C_3 t^*_o+C_4 t^{*2}_o+C_5 t^{*3}_o+C_6 \ln(t^*_o)] \quad \text{Eq. 27}$$

Where, $p2_{ws}$=saturation pressure at wetbulb temperature (psia) for the outdoor air, $t^*_o$=measured outdoor air wetbulb temperature+459.67 (R), and $$W^*_o = 0.621945\left[\frac{p2_{ws}}{pa - p2_{ws}}\right] \quad \text{Eq. 29}$$

Where, $W^*_o$=humidity ratio corresponding to saturation at the outdoor air wetbulb temperature, $t^*_o$ (lbm/lbm), and $$W_o = \frac{(1093 - 0.556 t^*_o) W^*_o - 0.24(t_o - t^*_o)}{(1093 + 0.444 t_o - t^*_o)} \quad \text{Eq. 31}$$

Where, $W_o$=outdoor air humidity ratio (lbm/lbm).

The method includes preferably calculating an initial value of the mixed-air humidity ratio $W_m$ from the $OAF_m$, $W_r$, and $W_o$ at step 114 using the following equation.

$$W_m = W_r - [W_r - W_o]OAF_m \quad \text{Eq. 33}$$

Where, $W_m$=humidity ratio at the mixed-air conditions (lbm/lbm).

Estimating an initial value of mixed-air wetbulb temperature ($t^*_m$) at step 116 is preferably setting an initial value of mixed-air wetbulb temperature ($t^*_m$) to the mixed-air drybulb temperature minus 10 degrees Fahrenheit in cooling mode ($t^*_m = t_m - 10$). Computing saturation pressure ($p_{ws}$) for the mixed-air wetbulb temperature ($t^*_m$) at step 118 is preferably performed using the initial or previous time-step estimate of the mixed-air wetbulb temperature, $t^*_m$, in the following equation.

$$p_{ws}=\text{EXP}[C_1/t^*_m+C_2+C_3 t^*_m+C_4 t^{*2}_m+C_5 t^{*3}_m+ C_6 \ln(t^*_m)] \quad \text{Eq. 35}$$

Where, $p_{ws}$=saturation pressure at wetbulb temperature (psia)

$t^*_m$=mixed-air wetbulb temperature+459.67 (i.e., converted to degrees Rankine).

The method includes calculating the saturation humidity ratio (W m) at step 118 from the saturation pressure ($p_{ws}$) using the following equation.

$$W_m^* = 0.621945 \left[ \frac{p_{ws}}{pa - p_{ws}} \right]$$ Eq. 37

Where, $W^*_m$=humidity ratio at the mixed-air saturation pressure ($p_{ws}$) (lbm/lbm).

The method includes calculating a new estimate of mixed-air wetbulb temperature ($t^*_m$) at step 120, preferably performed using the following equation including the previous step mixed-air wetbulb temperature ($t^*_{m_{i-1}}$) estimate.

$$t_m^* = 0.5 \left[ t_{m_{i-1}}^* + \frac{1093 W_m + 0.444 W_m t_m - 1093 W_m^* + 0.24 t_m}{W_m - 0.556 W_m^* + 0.24} \right]$$ Eq. 39

Where $t^*_m$=new estimate of mixed-air wetbulb temperature (F), and $t^*_{m_{i-1}}$=previous step mixed-air wetbulb temperature (F).

The new estimate of mixed-air wetbulb temperature is tested for convergence at step 122, to evaluate whether or not the absolute value of the change in $\Delta t^*_m$ is less than or equal to 0.01 degrees Fahrenheit using the following equation.

$$|\Delta t_m^*| \leq 0.01$$ Eq. 41

If the absolute value of the change in $\Delta t^*_m$ is less then or equal to 0.01 degrees Fahrenheit, then the method includes proceeding to step 124 to check whether or not the unit is operating in cooling mode. If step 124 determines that the absolute value of the change $\Delta t^*_m$ is not less than or equal to 0.01 degrees Fahrenheit, then steps 118, 120, and 122 are preferably repeated calculating $p_{ws}$ and $W^*_s$ a new estimate of $t^*_m$ until the absolute value of the recursive change in wetbulb temperature $\Delta t^*_m$ is less than or equal to 0.1 degrees Fahrenheit.

At step 124 the method includes storing coefficients a, b, and c, and the economizer actuator control voltage, $x_r$, to meet the minimum outdoor air fraction, $OAF_r$, to meet regulatory requirements, maximum $OAF_{max}$, closed $OAF_{closed}$, mixed-air drybulb temperature $t_m$, mixed-air wetbulb temperature, $t^*_m$, and return and outdoor air drybulb and wetbulb temperature measurements, $t_r$, $t^*_r$, $t_o$, and $t^*_o$, and proceeding to step 126.

Figure 8:
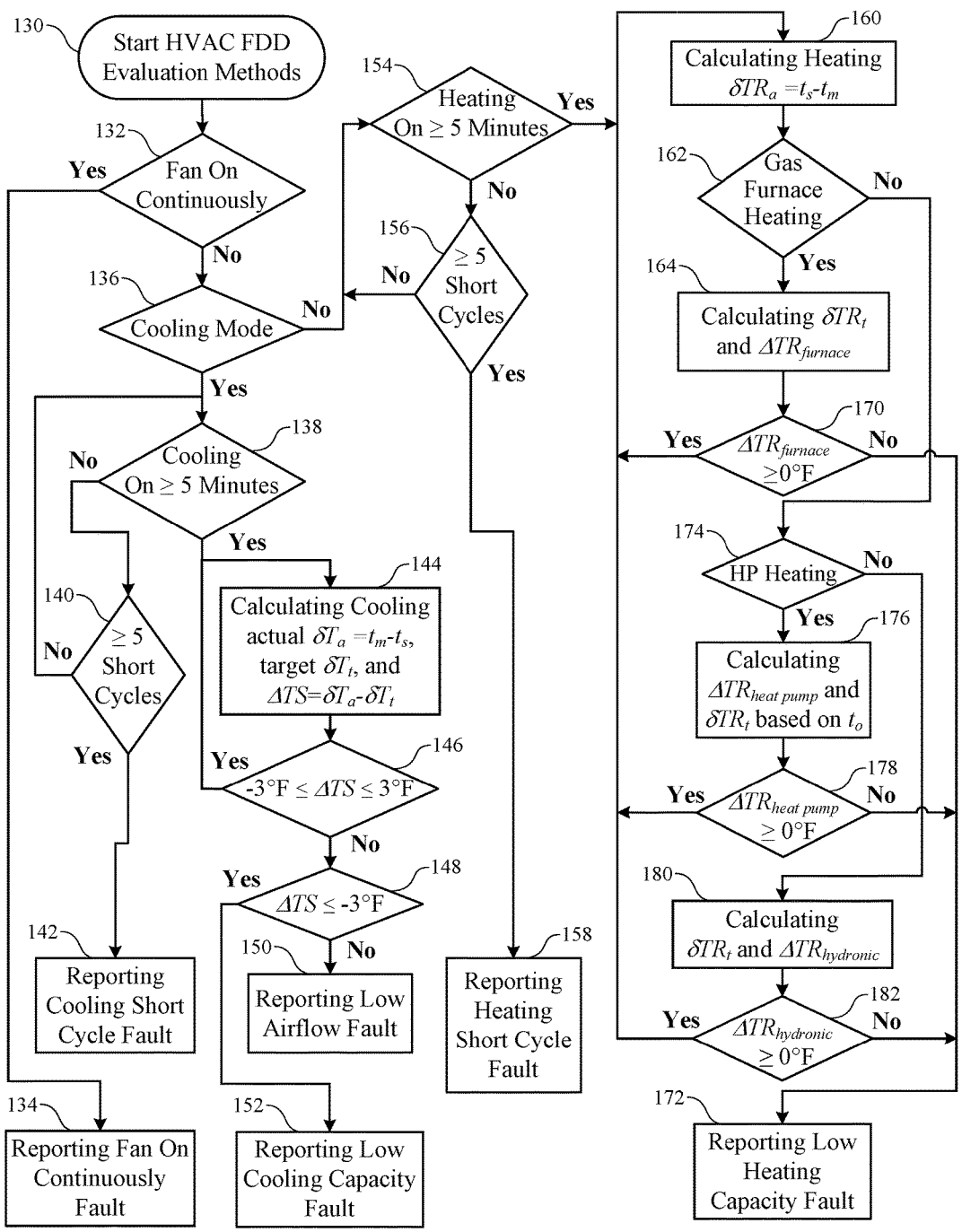
FIG. 8 shows a method for Fault Detection Diagnostic (FDD) evaluation on an HVAC system while the HVAC system is operating, according to the present invention.

At step 126, the method includes checking whether or not to evaluate HVAC FDD, and if not, ending the OAF optimization method at step 128, or going to step 129 and proceeding to step 131 and starting the HVAC FDD evaluation method shown in FIG. 8.

FIG. 8 shows a method for performing an FDD evaluation on an HVAC system while the HVAC system is operating according to the present invention. The method starts at step 130 and includes first checking whether or not the ventilation fan has been operating continuously at Step 132 based on continuous fan operation greater than a maximum fan run time, $FT_{max}$, for example 24 hours, or continuous fan operation with no heat source or cool source on, followed by a heat or cool source operational time, and followed by continuous fan operation with no heat source or cool source on. If the fan has been operating continuously, then the method includes reporting a fan on continuously fault at step 134.

If the fan has not been operating continuously, then the method proceeds to Step 136 and checking whether or not the HVAC system is in cooling or heating mode. If in cooling mode, the method includes detecting and diagnosing low airflow and low cooling capacity faults in steps 138 through 158. In some embodiments in cooling mode, the method includes performing FDD of refrigerant superheat based on $t^*_m$ and $t_o$ in steps 138 through 158. If in heating mode, the method includes steps for detecting and diagnosing low heating capacity faults in steps 154 through 182.

At step 138, the method includes checking if the cooling system has been operating for at least a minimum cooling run time, preferably five minutes, and if not, then the method includes checking short cycle cooling operation for five successive cycles (i.e., failing the test of step 138 five consecutive times) at Step 140, and if yes, then generating an FDD alarm signal reporting a cooling short cycle fault at Step 142.

After the minimum fan run time of cooling system operation at Step 144, the method includes calculating the actual temperature split difference ($\delta T_a$) based on the mixed-air drybulb temperature ($t_m$) minus the supply-air temperature ($t_s$) according to the following equation.

$$\delta T_a = t_m - t_s$$ Eq. 43

At step 144, the method also includes calculating the target temperature split difference ($\delta T_t$) across the cooling system evaporator and the temperature split difference $\Delta TS$ defined as the actual temperature split minus the target temperature split. The method includes calculating the target temperature split difference ($\delta T_t$) using a target temperature split lookup table shown in FIG. 11, where the independent variables are the evaporator entering mixed-air drybulb temperature, $t_m$, and evaporator entering mixed-air wetbulb temperature, $t^*_m$. The method also includes calculating the target temperature split difference ($\delta T_t$) using the following equation.

$$\delta T_t = C_7 + C_8 t_m + C_9 t_m^2 + C_{10} t^*_m + C_{11} t^{*2}_m + C_{12}(t_m \times t^*_m)$$ Eq. 45

Where, $\delta T_t$=target temperature difference between mixed-air and supply-air in cooling mode (F),
$t_m$=measured mixed-air drybulb temperature (F),
$t^*_m$=mixed-air wetbulb temperature (F),
$C_7$=−6.509848526 (F),
$C_8$=−0.942072257 (F$^{-1}$),
$C_9$=0.009925115 (F$^{-2}$),
$C_{10}$=1.944471104 (F$^{-1}$),
$C_{11}$=−0.02080340379991888 (F$^{-2}$)
$C_{12}$=−0.000114841 (F$^{-2}$)

At step 144, the method also includes calculating the delta temperature split difference ($\Delta TS$) based on the actual temperature split difference ($\delta T_a$) minus the target temperature split difference ($\delta T_t$) using the following equation.

$$\Delta TS = \delta T_a - \delta T_t$$ Eq. 47

Where, $\Delta TS$=delta temperature split difference between actual temperature split and target temperature split (F).

At step 146 the method checks whether or not the temperature split difference $\Delta TS$ is within plus or minus a temperature split threshold, preferably ±3 degrees Fahrenheit (or a user input value). If $\Delta TS$ is within plus or minus the temperature split threshold (or the user input value), then the cooling system is within tolerances, no FDD alarm signals are generated, and the method loops back to continue checking proper operation of the cooling system by repeating steps 144 and 146.

At step 148, the method checks whether or not the temperature split difference ($\Delta TS$) is less than a negative minimum temperature split difference threshold, preferably less than −3 degrees Fahrenheit (or a user input value). If the method determines the temperature split difference ($\Delta TS$) is less than the negative minimum temperature split difference threshold (or the user input value), then the method includes providing an FDD alarm signal reporting a low cooling capacity fault at step 152 to check for low cooling capacity which can be caused by many faults including excess outdoor airflow, dirty or blocked air filters, blocked evaporator caused by dirt or ice buildup, blocked condenser coils caused by dirt or debris buildup, low refrigerant charge, high refrigerant charge, refrigerant restrictions, or non-condensable air or water vapor in the refrigerant system.

At step 148, if the method determines that the temperature split difference (ΔTS) is not greater than the negative minimum temperature split difference threshold, then the method includes providing an FDD alarm signal at step 150 reporting a low airflow fault to check for low airflow which can cause ice to form on the air filter and evaporator which blocks airflow and severely reduces cooling capacity and efficiency.

At step 136 if the method determines the system is in heating mode, then the method includes proceeding to step 154.

At step 154, the method includes checking if the heating system has been operating for greater then a minimum heater run time, preferably five minutes, and if no, then the method includes checking short cycle heating operation for 5 successive cycles at Step 156, and if yes, then generating an FDD alarm signal reporting a heating short cycle fault at Step 158.

After at least the minimum heater run time of heating system operation at Step 160, the method includes calculating the actual temperature rise ($\delta TR_a$) for heating based on the supply-air temperature minus the mixed-air temperature according to the following equation.

$$\delta TR_a = t_s - t_m \qquad \text{Eq. 49}$$

At step 162, the method includes checking whether or not the heating system is a gas furnace, and if the method determines the heating system is a gas furnace, then the method proceeds to step 164.

Figure 12:
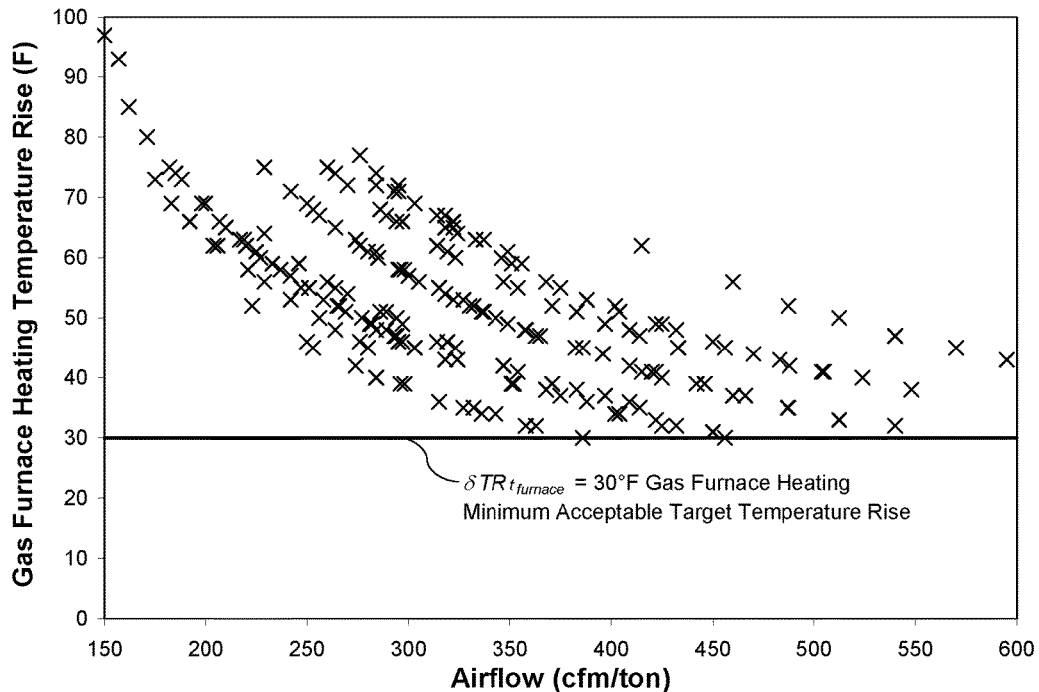
FIG. 12 shows a chart of gas furnace manufacturer minimum acceptable temperature rise data versus airflow for 253 models.

At step 164, the method includes calculating the minimum acceptable target supply-air temperature rise for a gas furnace which is preferably a function of airflow and heating capacity based on furnace manufacturer temperature rise data shown in FIG. 12, and is preferably 30 degrees Fahrenheit as shown in the following equation.

$$\delta TR_{t_{furnace}} = 30 \qquad \text{Eq. 51}$$

Where, $\delta TR_{t_{furnace}}$ =minimum acceptable furnace temperature rise.

The minimum acceptable furnace temperature rise may vary from 30 to 100 degrees Fahrenheit or more depending on make and model, furnace heating capacity, airflow, and return temperature.

At step 164, the method also includes calculating the delta temperature rise for the gas furnace heating system, $\Delta TR_{furnace}$, according to the following equation.

$$\Delta TR_{furnace} = \delta T_a - \delta TR_{t_{furnace}} \qquad \text{Eq. 53}$$

At step 170 the method includes calculating whether or not the delta temperature rise for the furnace is greater than or equal to zero degrees Fahrenheit according to the following equation.

$$\Delta TR_{furnace} = \delta T_a - \delta TR_{t_{furnace}} \geq 0 \qquad \text{Eq. 55}$$

At step 170, if the method determines the delta temperature rise for the furnace is greater than or equal to zero degrees Fahrenheit, then the gas furnace heating system is considered to be within tolerances, no FDD alarm signals are generated, and the method includes a loop to continue checking the temperature rise while the furnace heating system is operational using steps 160 through 170.

At step 170, if the method determines the delta temperature rise for the furnace is less than zero degrees Fahrenheit, then proceeds to step 172.

At step 172, for a gas furnace heating system, the method includes preferably providing at least one FDD alarm signal reporting a low heating capacity fault which can be caused by excess outdoor airflow, improper damper position, improper economizer operation, dirty or blocked air filters, low blower speed, blocked heat exchanger caused by dirt buildup, loose wire connections, improper gas pressure or valve setting, sticking gas valve, bad switch or flame sensor, ignition failure, misaligned spark electrodes, open rollout, open limit switch, limit switch cycling burners, false flame sensor, cracked heat exchanger, combustion vent restriction, improper orifice or burner alignment, or non-functional furnace.

At step 162, the method includes checking whether or not the heating system is a gas furnace, and if the method determines the heating system is not a gas furnace, then the method proceeds to step 170.

At step 174, the method includes checking whether or not the heating system is a heat pump, and if the method determines the heating system is a heat pump, then the method proceeds to step 176.

Figure 13:
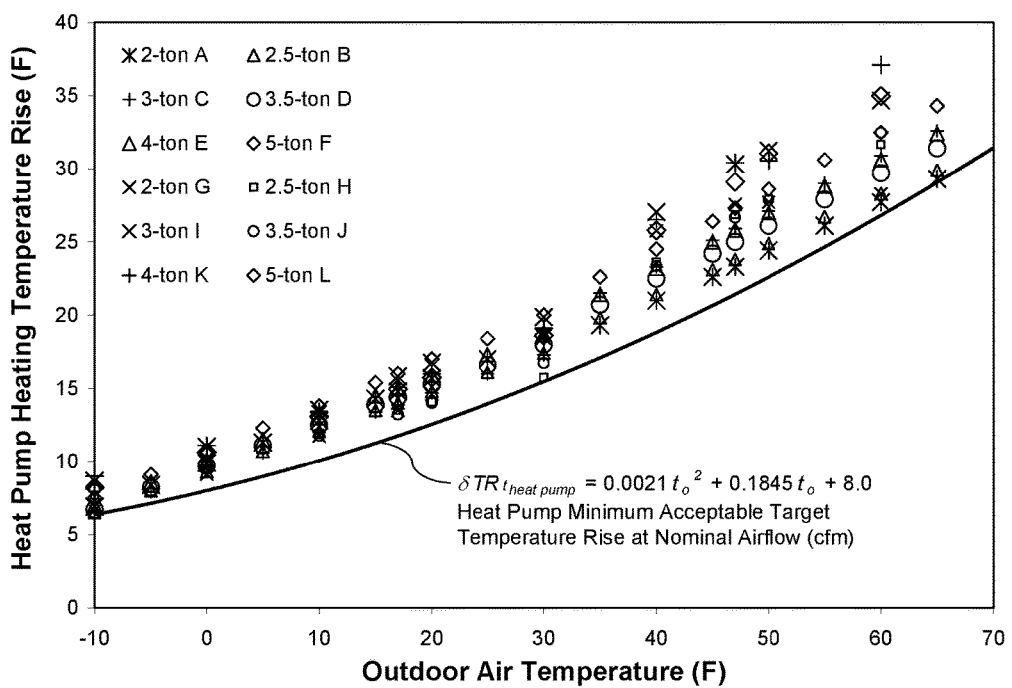
FIG. 13 shows a chart of heat pump manufacturer minimum acceptable temperature rise data versus outdoor air temperature for 12 different models.

At step 176, the method includes measuring the target temperature rise for heat pump heating based on the minimum acceptable target temperature rise which is preferably a function of outdoor air temperature as shown in the following equation based on heat pump manufacturer minimum acceptable temperature rise data shown in FIG. 13.

$$\delta TR_{t_{heat\ pump}} = [C_{21} t_o^2 + C_{22} t_o + C_{23}] \qquad \text{Eq. 57}$$

Where, $\delta TR_{t_{heat\ pump}}$ =minimum acceptable heat pump temperature rise, $C_{21} = 0.0021$ ($F^{-1}$), $C_{22} = 1.845$ (dimensionless), and $C_{23} = 8.0$ (F).

Temperature rise coefficients may vary depending on user input, heat pump make and model, heat pump heating capacity, airflow, outdoor air temperature, and return temperature. Minimum temperature rise coefficients for a heat pump are based on outdoor air temperatures ranging from −10 F to 65 Fahrenheit, airflow from 300 to 400 cfm/ton, and return temperatures from 60 to 80 degrees Fahrenheit.

At step 176, the method also includes calculating the delta temperature rise for the heat pump heating system according to the following equation.

$$\Delta TR_{heat\ pump} = \delta T_a - \delta TR_{t_{heat\ pump}} \qquad \text{Eq. 58}$$

At step 178, the method includes calculating whether or not the delta temperature rise for the heat pump heating system is greater than or equal to zero degrees Fahrenheit according to the following equation.

$$\Delta TR_{heat\ pump} = \delta T_a - \delta TR_{t_{heat\ pump}} \geq 0 \qquad \text{Eq. 59}$$

At step 178, if the method determines the delta temperature rise for the heat pump is greater than or equal to zero degrees Fahrenheit, then the heat pump heating system is considered to be within tolerances, no FDD alarm signals are generated, and the method includes a loop to continue checking the temperature rise while the heat pump heating system is operational using steps 160 through 178.

At step 178, if the method determines the delta temperature rise for the heat pump is less than zero degrees Fahrenheit, then the method proceeds to step 172.

At step 172, for a heat pump heating system, the method includes preferably providing at least one FDD alarm signal reporting a low heating capacity fault to check the system for low heating capacity which can be caused by many faults including excess outdoor airflow, improper damper position, improper economizer operation, dirty or blocked air filters, blocked heat pump indoor coil caused by dirt buildup, improper thermostat setup or malfunction, loose wire connections, blocked outdoor coil caused by ice, dirt or debris, defective capacitor or relay, failed outdoor coil fan motor or capacitor, failed reversing valve or improper reversing valve control, improper refrigerant charge, refrigerant restriction (filter drier or expansion device), non-condensable air or water vapor in system, malfunctioning defrost controller, high airflow above 450 cfm/ton, failing compressor (locked rotor, leaking valves, etc.), or non-functional heat pump.

At step 174, if the method determines the heating system is not a heat pump, then the method proceeds to step 180.

At step 180, the method measures the target temperature rise for the hydronic heating system based on the minimum acceptable target supply-air temperature rise according to the following equation which is preferably a function of hot water supply temperature and may vary from 18 to 73 degrees Fahrenheit depending on airflow, coil heating capacity, and hot water supply temperature, $t_{hw}$, as shown in FIG. 14.

$$\delta TR_{t_{hydronic}} = [C_{25} t_{hw} + C_{26}] \quad \text{Eq. 61}$$

Where, $\delta TR_{t_{hydronic}}$=minimum acceptable hydronic temperature rise, $C_{25}$=0.35 ($F^{-1}$), and $C_{26}$=−24 (F).

The method also includes the following simplified equation to measure the target temperature rise for the hydronic heating system for all systems regardless of hot water supply temperature as shown in FIG. 14.

$$\delta TR_{t_{hydronic}} = C_{27} \quad \text{Eq. 62}$$

Where, $\delta TR_{t_{hydronic}}$=minimum acceptable hydronic temperature rise, $C_{27}$=19 degrees Fahrenheit (F).

At step 180, the method also includes calculating the delta temperature rise for the hydronic heating system according to the following equation.

$$\Delta TR_{hydronic} = \delta T_a - \delta TR_{t_{hydronic}} \quad \text{Eq. 63}$$

At step 182, the method includes calculating whether or not the delta temperature rise for the hydronic heating systems greater than or equal to zero degrees Fahrenheit according to the following equation.

$$\Delta TR_{hydronic} = \delta T_a - \delta TR_{t_{hydronic}} \geq 0 \quad \text{Eq. 65}$$

At step 182, if the method determines the delta temperature rise for the hydronic heating system is greater than or equal to zero degrees Fahrenheit, then the hydronic heating system is considered to be within tolerances, no FDD alarm signals are generated, and the method includes a loop to continue checking the temperature rise while the hydronic heating system is operational using steps 160 through 182.

At step 182, if the method determines the delta temperature rise for the hydronic heating system is less than zero degrees Fahrenheit, then the method proceeds to step 172.

At step 172, for a hydronic heating system, the method includes preferably providing at least one FDD alarm signal reporting a low heating capacity fault to check the system for low heating capacity which can be caused by many faults including excess outdoor airflow, improper damper position, improper economizer operation, dirty or blocked air filters, blocked hydronic coil caused by dirt buildup, improper thermostat setup or malfunction, loose wire connections, failed or stuck hydronic control valve, defective capacitor or relay, low hot water temperature setting, failed water heater or boiler, leak or loss of hydronic fluid, failed capacitor, high airflow above 450 cfm/ton, air in hydronic system, or non-functional hydronic circulation controller or pump.

In some embodiments, the method includes providing FDD alarms regarding the following faults: excess outdoor air, damper actuator failure, low airflow, low cooling capacity, or low heating capacity. In some embodiments the present invention includes methods to communicate FDD alarms using wired or wireless communication to display error codes or alarms on the present invention apparatus through a built-in display or external display through wired or wireless communication signals to a building energy management system, standard thermostat, WIFI-enabled thermostat, internet-connected computer, internet telephony system, or smart phone indicating maintenance requirements to check and correct outdoor air damper position, evaporator airflow and/or refrigerant charge of the air conditioning system.

While the invention herein disclosed has been described by means of specific embodiments and applications thereof, numerous modifications and variations could be made thereto by those skilled in the art without departing from the scope of the invention set forth in the claims.

I claim:

1. A method for performing Fault Detection Diagnostics (FDD) and optimizing an economizer Outdoor Air Fraction (OAF) while a Heating, Ventilating, Air Conditioning, (HVAC) system is operating, wherein the OAF is defined as the ratio of the outdoor air volumetric flow rate divided by the total HVAC system volumetric flow rate, the method comprising:

positioning a first temperature sensor in a mixed-air chamber of an HVAC system;

measuring mixed-air drybulb temperature, $t_m$, by the first temperature sensor;

positioning a second temperature sensor in well-mixed return air;

measuring return air drybulb temperature, $t_r$, by the second temperature sensor;

positioning a third temperature sensor in the well-mixed outdoor air;

measuring outdoor air drybulb temperature, $t_o$, by the third temperature sensor;

computing a measured $OAF_m$ from the $t_r$, the $t_o$, and the $t_m$;

comparing the measured $OAF_m$ to a required $OAF_r$ defined as the required minimum outdoor air volumetric flow rate divided by the total HVAC system volumetric flow rate for the building occupancy category;

if the measured $OAF_m$ is not within an accepted tolerance of the required $OAF_r$, then adjusting economizer outdoor air dampers to tune the measured $OAF_m$ to be nearer to the required $OAF_r$ per regulatory standards;

repeating computing the measured $OAF_m$ from the $t_r$, the $t_o$, and the $t_m$; and finishing the method when the measured $OAF_m$ is within the acceptable tolerance of the required $OAF_r$;

wherein adjusting the economizer outdoor air dampers to achieve the optimal minimum outdoor air fraction, $OAF_r$, comprises:

energizing a ventilation fan and an economizer controller while the HVAC system is operating to initiate an economizer damper actuator voltage to a minimum economizer damper actuator voltage, $x_{min}$, to the open the economizer outdoor air dampers to a pre-existing minimum damper position;

measuring and storing the minimum economizer damper actuator voltage, $x_{min}$, and computing a corresponding minimum outdoor air fraction, $OAF_{min}$, based on present measurements of the return-air drybulb temperature, $t_r$, the outdoor-air drybulb temperature, $t_o$, and the mixed-air drybulb temperature, $t_m$;

adjusting the economizer damper actuator voltage to open the economizer outdoor air dampers to the fully-open maximum position;

measuring and storing a maximum economizer damper actuator voltage, $x_{max}$, and computing and storing a maximum $OAF_{max}$ based on the present measurements of the $t_r$, the $t_o$, and the $t_m$ at the corresponding maximum economizer damper actuator voltage, $x_{max}$;

adjusting the economizer damper actuator control voltage to fully close the economizer outdoor air dampers;

measuring and storing a closed economizer damper actuator voltage, $x_{closed}$, and computing and storing a closed outdoor air fraction, $OAF_{closed}$, based on measurements of the $t_r$, the $t_o$, and the $t_m$ at the corresponding closed economizer damper actuator voltage, $x_{closed}$;

performing a line or curve fit to at least three ordered pairs of the economizer damper actuator voltage ($x_{min}$, $x_{max}$, and $x_{closed}$) and the corresponding OAF measurements ($OAF_{min}$, $OAF_{max}$, and $OAF_{closed}$) to obtain a mathematical formula for actuator voltage x as a function of OAF;

computing an actuator voltage $x_r$ as a function of a required minimum $OAF_r$;

adjusting the economizer outdoor air damper using the actuator voltage, $x_r$;

computing and storing a new OAF based on the present measurements of the $t_r$, the $t_o$, and the $t_m$;

determining if the new OAF is within an acceptable tolerance of the required minimum $OAF_r$; and if the new OAF is not within an acceptable tolerance of the required minimum $OAF_r$, repeating the method replacing $OAF_{min}$ with $OAF_r$ and $x_{min}$ with $x_r$ and re-computing and applying the actuator voltage, $x_r$.

2. The method of claim 1, wherein obtaining the OAF as a function of the actuator voltage comprises calculating the coefficients of a predictive quadratic regression equation using a least squares method involving partial derivatives to minimize residuals for each ordered pair of data by expressing the least squares regression equation in matrix form, comprising the steps of:

constructing a 3×3 matrix X, containing exactly one "n" element and summations of "1" to "n" x-value exponential elements and summations of "1" to "n" x-value elements;

inverting the X matrix to obtain $X^{-1}$;

constructing a matrix Y, containing minimized residual elements including summations of "1" to "n" x-values to the power n−1 times y-values, summations of "1" to "n" x-values times y-values, and summations of "1" to "n" y-values; and multiplying $X^{-1}$ times Y to obtain regression equation coefficients a, b, and c, wherein the optimal economizer damper actuator voltage, $x_r$, is calculated using a quadratic formula involving regression coefficients a, b, and c and wherein the $OAF_r$ value is subtracted from coefficient c.

3. The method of claim 1, further including, after optimizing the measured $OAF_m$ while the HVAC system is operating:

positioning a fourth temperature sensor in the well-mixed supply air to measure a well-mixed supply air drybulb temperature, $t_s$;

measuring the well-mixed supply air drybulb temperature, $t_s$, by the fourth temperature sensor;

computing the humidity ratio (Ibm/Ibm) of return-air $W_r$, based on measurements of return-air drybulb temperature, $t_r$, and return-air wetbulb temperature, $t^*_r$;

computing the humidity ratio of outdoor-air, $W_o$, based on measurements of an outdoor-air drybulb temperature, $t_o$, and an outdoor-air wetbulb temperature, $t^*_o$;

computing a mixed-air humidity ratio, $W_m$, based on a return-air humidity ratio, $W_r$, minus a difference of $W_r$ minus an outdoor-air humidity ratio, $W_o$, times the measured outdoor air fraction $OAF_m$;

computing a mixed-air wetbulb temperature, $t^*_m$, by first estimating an initial value for $t^*_m$, and using a recursive method to obtain an accurate value of the mixed-air wetbulb temperature, $t^*_m$, the recursive method comprising:

computing a mixed-air saturation pressure, $p_{ws}$, and a mixed-air saturation humidity ratio, $W^*_m$, based on the initial estimate or subsequent estimate of a mixed-air wetbulb temperature, $t^*_m$;

calculating a new estimate of the mixed-air wetbulb temperature, $t^*_m$, based on the mixed-air humidity ratio, $W_m$, the mixed-air drybulb temperature, $t_m$, the mixed-air saturation humidity ratio, $W^*_m$, and the previous step mixed-air wetbulb temperature, $t^*_{m_{i-1}}$;

calculating an absolute value of the temperature difference, $\Delta t^*_m$, between the new estimate of mixed-air wetbulb temperature, $t^*_m$, and the previous step mixed-air wetbulb temperature, $t^*_{m_{i-1}}$, and evaluating whether or not the absolute value of the temperature difference, $\Delta t^*_m$, is acceptably accurate; and if the absolute value of the temperature difference, $\Delta t^*_m$, is not acceptably accurate, then looping back to through the recursive method; or if the absolute value of the temperature difference, $\Delta t^*_m$, is acceptably accurate, then measuring the supply air drybulb temperature, $t_s$; and at least one of if the unit is operating in cooling mode:

evaluating proper air flow and sensible cooling capacity based on an actual temperature split difference, $\delta T_a$, across the cooling system evaporator based on the measured mixed-air drybulb temperature, $t_m$, minus the measured supply-air drybulb temperature, $t_s$, and comparing this difference to a minimum acceptable threshold temperature split difference based on lookup tables or manufacturer data; and If the unit is operating in heating mode:

evaluating proper heating capacity based on an actual temperature rise, $\delta TR_a$, across the heat exchanger based on the measured supply-air temperature, $t_s$, minus the measured mixed-air drybulb temperature, $t_m$, and comparing this difference to a minimum acceptable threshold temperature rise based on lookup tables or manufacturer data.

4. The method of claim 3, wherein the mixed-air wetbulb temperature, $t^*_m$, is computed by first estimating a value for $t^*_m$ and then using a recursive method to obtain an absolute value of accuracy between recursive estimates of $t^*_m$ that is less than 0.01 degrees Fahrenheit.

5. The method of claim 3, wherein computing a new estimate of the mixed-air wetbulb temperature, $t^*_m$, comprises:
  computing the mixed-air humidity ratio, $W_m$, based on return-air humidity ratio, $W_r$, minus the difference of $W_r$ minus outdoor-air humidity ratio, $W_o$, times the measured outdoor air fraction $OAF_m$;
  computing the saturated humidity ratio, $W^*_m$, based on the saturation vapor pressure, $p_{ws}$, calculated from the initial or previous step mixed-air wetbulb temperature, $t^*_{m_{i-1}}$;
  computing an intermediate estimate of the mixed-air wetbulb temperature, $t^*_{m_i}$, based on the mixed-air humidity ratio, $W_m$, measured mixed-air drybulb temperature, $t_m$, and calculated mixed-air saturation humidity ratio, $W^*_m$; and
  averaging the intermediate estimate of the mixed-air wetbulb temperature, $t^*_{m_i}$, with the previous step mixed-air wetbulb temperature $t^*_{m_{i-1}}$, to compute a new estimate of the mixed-air wetbulb temperature, $t^*_m$.

6. The Method of claim 1, wherein:
  when the absolute value of the difference between the outdoor air drybulb temperature, $t_o$ and return air drybulb temperature, $t_r$, is at least a minimum temperature difference, adjusting the economizer outdoor air damper comprises, using an electronically controlled actuator, opening the economizer outdoor air dampers if the measured $OAF_m$ is less than the required $OAF_r$, and closing the economizer outdoor air dampers if the measured $OAF_m$ is greater than the required $OAF_r$;
  repeating the above steps until the measured $OAF_m$ is within an accepted tolerance of the required $OAF_r$; and
  verifying that the measured $OAF_m$ with an acceptable tolerance of the required OAF.

7. The method of claim 6, wherein after the measured $OAF_m$ is verified to within the accepted tolerance of the required minimum $OAF_r$ and the HVAC system is operating in cooling mode, further including:
  positioning a first humidity/wetbulb sensor in the well-mixed return air;
  measuring a return air wetbulb temperature, $t^*_r$, by the first humidity/wetbulb sensor;
  positioning a second humidity/wetbulb sensor in the well-mixed outdoor air;
  measuring outdoor air wetbulb temperature, $t^*_o$, by the second humidity/wetbulb sensor;
  measuring the evaporator entering mixed-air entering drybulb temperature, $t_m$;
  calculating the evaporator entering mixed-air wetbulb temperature $t^*_m$;
  positioning a fourth drybulb sensor in the well-mixed supply-air;
  measuring a supply air drybulb temperature, $t_s$;
  computing an actual temperature split difference across the evaporator, $\delta T_a$, based on the measured mixed-air drybulb temperature, $t_m$, minus the measured supply-air temperature, $t_s$;
  determining a target temperature split difference, $\delta T_t$, across an evaporator based on lookup tables or manufacturer data or a target temperature split difference equation based on the measured evaporator entering mixed-air drybulb temperature, $t_m$, and the calculated evaporator entering mixed-air wetbulb temperature, $t^*_m$;
  calculating a delta temperature split difference, $\Delta TS$, based on the actual temperature split difference, $\delta T_a$, minus the target temperature split difference, $\delta T_t$;
  evaluating a proper airflow and a sensible cooling capacity based on a minimum acceptable threshold tolerance for the delta temperature split difference, $\Delta TS$.

8. The method of claim 6, wherein after the measured $OAF_m$ is verified to within the accepted tolerance of the required minimum $OAF_r$, further including:
  repeating measuring the mixed-air drybulb temperature, $t_m$, by the first temperature sensor;
  positioning a fourth temperature sensor in the well-mixed supply-air;
  measuring a well-mixed supply-air drybulb temperature, $t_s$, by the fourth temperature sensor;
  computing an actual temperature rise, $\delta TR_a$, across a heat exchanger in the heating mode based on the measured supply-air temperature, $t_s$, minus the measured mixed-air drybulb temperature, $t_m$;
  determining a target temperature rise, $\delta TR_t$, across the heat exchanger based on lookup tables or manufacturer data based on the measured outdoor air temperature, $t_o$, an airflow (cfm), or a hot water supply temperature, $t_{hw}$;
  calculating a delta temperature rise difference, $\delta TR$, based on the actual temperature rise difference, $\delta TR_a$, minus the target temperature rise difference, $\delta TR_t$; and
  evaluating proper heating capacity based on a minimum acceptable threshold tolerance for the delta temperature rise difference, $\Delta TR$, or proper furnace temperature rise based on a maximum acceptable threshold tolerance for the delta temperature rise difference, $\Delta TR$.

9. Method of claim 6, wherein after the measured $OAF_m$ is verified to be within the accepted tolerance of the required minimum $OAF_r$, the method further comprises at least one of:
  checking if a fan only has been operating continuously based on at least one of:
    the fan operating continuously with no heat source or cool source on where the fan is operating continuously for greater than a maximum fan run time;
    the fan operating continuously with no heat source or cool source on followed by a heat source operational time and then followed by the fan operating continuously with no heat source or cool source on; and
    the fan operating continuously with no heat source or cool source on followed by a cool source operational time and followed by the fan operating continuously with no heat source or cool source on; and
  if the fan only has been operating continuously, then generating a first FDD alarm signal reporting the fan only operating continuously; and
  waiting for the HVAC system to reach equilibrium in at least one of:
    a cooling mode, and
    a heating mode; and
  if the HVAC system is not operating for at least a minimum cycle time at least a minimum number of successive cycles, then generating an FDD alarm signal reporting short cycling of the HVAC system;
  wherein the FDD alarm signals are generated using an error code, a signal, a text message, an email, or other information displayed on a standard thermostat, WIFI-enabled thermostat, internet-connected computer, internet telephony system, or smart phone software application indicating maintenance requirements for a technician to check continuous fan operation or short cycling for the cooling or heating system.

10. Method of claim 6, wherein after the measured $OAF_m$ is verified to be within the accepted tolerance of the required minimum $OAF_r$ and the HVAC system is operating in cooling mode, the method further comprises:
- measuring an evaporator entering mixed-air drybulb temperature, $t_m$;
- computing or measuring an evaporator entering mixed-air wetbulb temperature, $t^*_m$;
- measuring a supply-air drybulb temperature, $t_s$;
- computing an actual temperature split across the evaporator, $\delta T_a$, in cooling mode based on at least one temperature split selected from the group consisting of:
  - the mixed-air drybulb temperature, $t_m$, minus the supply-air drybulb temperature, $t_s$, and
  - the return air drybulb temperature, $t_r$, minus the supply-air drybulb temperature, $t_s$;
- computing a target temperature split, $\delta T_t$, in cooling mode across the evaporator using either a target temperature split lookup table or bi-quadratic equation where the independent variables are at least one temperature selected from the group consisting of:
  - the evaporator entering mixed-air drybulb temperature, $t_m$,
  - the evaporator entering mixed-air wetbulb temperature, $t^*_m$,
  - the return air drybulb temperature, $t_r$, and
  - the return air wetbulb temperature, $t^*_r$;
- computing a delta temperature split, $\Delta TS$, across the evaporator in cooling mode wherein the $\Delta TS$ is equal to the actual temperature split, $\delta T_a$, minus the target temperature split, $\delta T_t$; and
- if $\Delta TS$ is within an acceptable minimum to maximum temperature split range, then the cooling system is within tolerances for proper airflow and sensible cooling capacity and no FDD alarm signal is generated for the cooling system; or
- if the $\Delta TS$ is greater than a maximum acceptable temperature split tolerance, then the airflow is low and generating a first FDD alarm signal reporting a low airflow fault; or
- if $\Delta TS$ is less than a minimum acceptable temperature split tolerance, then a sensible cooling capacity is low, and generating a second FDD alarm signal reporting a low cooling capacity fault for the system; and
- wherein the first and second FDD alarm signals are generated using an error code, a signal, a text message, an email, or other information displayed on a standard thermostat, WIFI-enabled thermostat, internet-connected computer, internet telephony system, or smart phone software application indicating maintenance requirements for a technician to check low airflow or low cooling capacity.

11. Method of claim 10, wherein the target temperature split, $\delta T_t$, used to evaluate the sensible cooling capacity in cooling mode across the evaporator is calculated using at least one bi-quadratic to calculate target temperature split, $\delta T_t$, selected from the group consisting of:

$$\delta T_t = C_7 + C_8 t_m + C_9 t_m^2 + C_{10} t^*_m + C_{11} t^{*2}_m + C_{12}(t_m \times t^*_m),$$
and $$\delta T_t = C_7 + C_8 t_r + C_9 t_r^2 + C_{10} t^*_r + C_{11} t^{*2}_r + C_{12}(t_r \times t^*_r),$$ and wherein
- the first coefficient, $C_7$, is equal to $-6.509848526$ (F); and
- the second coefficient, $C_8$, is equal to $-0.942072257$ ($F^{-1}$); and
- the third coefficient, $C_9$, is equal to $0.009925115$ ($F^{-2}$); and
- the fourth coefficient, $C_{10}$, is equal to $1.944471104$ ($F^{-1}$); and
- the fifth coefficient, $C_{11}$, is equal to $-0.0208034037991888$ ($F^{-2}$); and
- the sixth coefficient, $C_{12}$, is equal to $-0.000114841$ ($F^{-2}$).

12. Method of claim 6, wherein after the measured $OAF_m$ is verified to be within the accepted tolerance of the required minimum $OAF_r$ and the HVAC system is operating in heating mode, the method further comprises:
- computing a temperature rise $\delta TR_a$, across the heat exchanger based on the difference between the supply-air drybulb temperature, $t_s$, minus the mixed-air drybulb temperature, $t_m$, to evaluate a heating capacity for at least one heat source selected from the group consisting of:
  - a gas furnace wherein a minimum furnace acceptable target temperature rise, $\delta TR_{t_{furnace}}$, is a first constant temperature,
  - a heat pump wherein a minimum heat pump acceptable target temperature rise, $\delta TR_{t_{heat\,pump}}$, is a function of outdoor temperature, $t_o$, and
  - a hydronic heating system wherein a minimum hydronic acceptable target temperature rise, $\delta TR_{t_{hydronic}}$, is a function of an inlet hot water supply temperature, $t_{hw}$, or a third constant temperature;
- computing a delta temperature rise difference, $\Delta TR$, across the heat exchanger in heating mode wherein the $\Delta TR$ is equal to actual temperature rise, $\delta TR_a$, minus target temperature rise, $\delta TR_t$;
- if the delta temperature rise difference, $\Delta TR$, is greater than or equal to a minimum temperature rise, then the heating system is within tolerances and no FDD alarm signal is generated for the heating system; and
- if the delta temperature rise difference, $\Delta TR$, is less than the minimum temperature rise, then a sensible heating capacity is low and generating a first FDD alarm signal reporting a low heating capacity fault for the HVAC system, wherein the first FDD alarm signal is generated using an error code, a signal, a text message, an email, or other information displayed on a standard thermostat, WIFI-enabled thermostat, internet-connected computer, internet telephony system, or smart phone software application indicating maintenance requirements for a technician to check a low heating capacity fault.

13. Method of claim 12, wherein:
the minimum acceptable target temperature rise for a gas furnace, $\delta TR_{t_{furnace}}$ is approximately 30 degrees Fahrenheit;
the minimum acceptable target temperature rise for a heat pump, $\delta TR_{t_{heat\,pump}}$ is:
at least 7 degrees Fahrenheit, or $$\delta TR_{t_{heat\,pump}} = [C_{21} t_o^2 + C_{22} t_o + C_{23}]$$

wherein
- the first coefficient, $C_{21}$, is $0.0021$ ($F^{-1}$); and
- the second coefficient, $C_{22}$, is $0.1845$ (dimensionless); and
- the third coefficient, $C_{23}$, is 8 degrees Fahrenheit (F); and the minimum acceptable target temperature rise for a hydronic heating system, $\delta TR_{t_{hydronic}}$, is at least one of:

$$\delta TR_{t_{hydronic}} = [C_{23} t_{hw} + C_{26}]$$

wherein
the first coefficient, $C_{25}$, is equal to 0.35 ($F^{-1}$) times a hydronic heating
system heat exchanger inlet hot water temperature, $t_{hw}$; and
the second coefficient, $C_{26}$, is minus 24 (F); and $$\delta TR_{t_{hydronic}} = C_{27}$$

wherein
the coefficient, $C_{27}$, is equal to 19 (F); and
the delta temperature rise difference, $\Delta TR$, across the heat exchanger in heating mode is equal to actual temperature rise, $\delta TR_a$, minus target temperature rise, $\delta TR_t$; and
if the delta temperature rise difference, $\Delta TR$, is greater than or equal to 0 degrees Fahrenheit, then the heating system is within tolerances and no FDD alarm signal is generated for the system; or
if the delta temperature rise difference, $\Delta TR$, is less than 0 degrees Fahrenheit, then the sensible heating capacity is low and generating the first FDD alarm signal reporting a low heating capacity fault for the system;
wherein the first FDD alarm signal is generated using an error code, a signal, a text message, an email, or other information displayed on a standard thermostat, WIFI-enabled thermostat, internet-connected computer, internet telephony system, or smart phone software application indicating maintenance requirements for a technician to check a low heating capacity fault.

14. Method of claim 6, wherein after the measured $OAF_m$ is verified to be within an acceptable tolerance of the required $OAF_r$, and the HVAC system is operating in cooling mode, the method further comprises:
if the $\Delta TS$ is greater than a cooling mode maximum acceptable temperature split tolerance indicating the airflow is low, then a third FDD alarm signal is generated reporting low airflow fault; and
if $\Delta TS$ is less than a cooling mode minimum acceptable temperature split tolerance indicating the sensible cooling capacity is low, then generating a fourth FDD alarm signal reporting low cooling capacity fault for the system;
wherein the third and fourth FDD alarm signals are generated using an error code, a signal, a text message, an email, or other information displayed on a standard thermostat, WIFI-enabled thermostat, internet-connected computer, internet telephony system, or smart phone software application indicating maintenance requirements for a technician to check sensible cooling capacity.

15. Method of claim 14, wherein the delta temperature split difference, $\Delta TS$, cooling mode maximum acceptable temperature split tolerance is three degrees Fahrenheit and the cooling mode minimum acceptable temperature split tolerance is minus three degrees Fahrenheit.

16. Method of claim 6, wherein:
if the economizer outdoor air damper is in a minimum position with the HVAC system operating, and measurements of the $t_r$, the $t_o$, and the $t_m$ and the measured $OAF_m$ determine that the measured $OAF_m$ is not within the accepted tolerance of the required minimum $OAF_r$:
providing at least one of an error code, a signal, a text message, an email, or other information displayed on a standard thermostat, WIFI-enabled thermostat, internet-connected computer, internet telephony system, or smart phone software application indicating maintenance requirements for a technician to check and correct outdoor air damper position, evaporator airflow;
repairing unintended outdoor air leakage through the economizer outdoor air damper, cabinet or perimeter frame of the economizer assembly; and
repeating measurements of the $t_r$, the $t_o$, and the $t_m$ and computing $OAF_m$; and
if the $OAF_m$ measurement is not within an acceptable tolerance of the minimum allowable ventilation requirement specified in:
using an electronically controlled actuator, opening the economizer outdoor air damper if the measured $OAF_m$ is less than the required $OAF_r$, and closing the economizer outdoor air damper if the measured $OAF_m$ is greater than the required $OAF_r$;
repeating measurements of the $t_r$, the $t_o$, and the $t_m$ and computing the $OAF_m$; and
repeating using the electronically controlled actuator to adjust the economizer outdoor air damper position until the $OAF_m$ is within an acceptable tolerance of the required minimum $OAF_r$; and
wherein the acceptable tolerance is within ten percent of the required minimum $OAF_r$.

17. Method of claim 1, wherein the accepted tolerance of the required OAFr is within plus or minus ten percent of the minimum required $OAF_r$.

18. The method of claim 9, where the minimum cycle time is at least five minutes and the minimum number of successive cycles is at least five successive cycles.

19. A method for obtaining a desired Outdoor Air Fraction (OAF) while the Heating, Ventilating, Air Conditioning, (HVAC) system is operating, wherein the OAF is defined as the ratio of the outdoor air volumetric flow rate divided by the total HVAC system volumetric flow rate, the method comprising:
taking measurements and computing a measured $OAF_m$ comparing the measured $OAF_m$ to a desired $OAF_d$;
if the measured $OAF_m$ is not within an accepted tolerance of the desired $OAF_d$, then adjusting economizer outdoor air dampers to tune the measured $OAF_m$ to be nearer to the desired $OAF_d$ comprising:
energizing a ventilation fan and the economizer controller while the HVAC system is operating to initiate an economizer damper actuator voltage to a minimum economizer damper actuator voltage, $x_{min}$, to open the economizer outdoor air dampers to a pre-existing minimum damper position;
measuring and storing the minimum economizer damper actuator voltage, $x_{min}$, and computing a corresponding minimum outdoor air fraction, $OAF_{min}$;
adjusting the economizer damper actuator voltage to open the economizer outdoor air dampers to the fully-open maximum position;
measuring and storing a maximum economizer damper actuator voltage, $x_{max}$, and computing and storing a maximum $OAF_{max}$;
adjusting the economizer damper actuator control voltage to fully close the economizer outdoor air dampers;
measuring and storing a closed economizer damper actuator voltage, $x_{closed}$ and computing and storing a closed outdoor air fraction, $OAF_{closed}$;
performing a line fit to ordered pairs of the economizer damper actuator voltage ($x_{min}$, $x_{max}$, and $x_{closed}$) and the corresponding OAF measurements ($OAF_{min}$, $OAF_{max}$, and $OAF_{closed}$) to obtain a mathematical formula for economizer damper actuator voltage x as a function of OAF;

computing a required economizer damper actuator voltage, $x_r$, as a function of the desired $OAF_d$;

adjusting the economizer outdoor air damper using the required economizer damper actuator voltage, $x_r$;

computing and storing a new OAF; and determining if the new OAF is within an acceptable tolerance of the desired $OAF_d$;

if the new OAF is not within an acceptable tolerance of the desired $OAF_d$ repeating computing the measured $OAF_m$; and finishing the method when the measured $OAF_m$ is within the acceptable tolerance of the desired $OAF_d$.

20. The method of claim 19, wherein the taking measurements and computing the measured $OAF_m$ comprises:

positioning a first temperature sensor in a mixed-air chamber of an HVAC system;

measuring mixed-air drybulb temperature, $t_m$, by the first temperature sensor;

positioning a second temperature sensor in well-mixed return air;

measuring return air drybulb temperature, $t_r$, by the second temperature sensor;

positioning a third temperature sensor in the well-mixed outdoor air;

measuring outdoor air drybulb temperature, $t_o$, by the third temperature sensor; and computing a measured $OAF_m$ from the $t_r$, the $t_o$, and the $t_m$.

21. The method of claim 19, Further including after adjusting the economizer outdoor air damper using the required economizer damper actuator voltage, $x_r$:

computing a new OAF;

determining if the new OAF is within an acceptable tolerance of the desired $OAF_d$; and if the new OAF is not within an acceptable tolerance of the desired $OAF_d$, replacing $OAF_{min}$ with $OAF_r$ and $x_{min}$ with $x_r$, and repeating the method for computing and applying the required economizer damper actuator voltage, $x_r$.

22. The method of claim 21, wherein the desired $OAF_d$ is a required minimum outdoor air volumetric flow rate divided by the total HVAC system volumetric flow rate for the building occupancy category.

23. The method of claim 22, wherein the accepted tolerance of the new OAF is within plus or minus ten percent of the desired $OAF_d$.

24. A method for performing Fault Detection Diagnostics (FDD) and optimizing an economizer Outdoor Air Fraction (OAF) while the Heating, Ventilating, Air Conditioning, (HVAC) system is operating, wherein the OAF is defined as the ratio of the outdoor air volumetric flow rate divided by the total HVAC system volumetric flow rate, the method comprising:

taking measurements and computing a measured $OAF_m$ comparing the measured $OAF_m$ to a desired $OAF_d$;

if the measured $OAF_m$ is not within an accepted tolerance of the desired $OAF_d$, then adjusting economizer outdoor air dampers to tune the measured $OAF_m$ to be nearer to the desired $OAF_d$, computing a required economizer damper actuator voltage, $x_r$, comprising:

energizing a ventilation fan and economizer controller while the HVAC system is operating;

measuring a first economizer damper actuator voltage $x_1$ while the economizer outdoor air dampers are at a first damper position;

computing a first outdoor air fraction, $OAF_1$;

setting an economizer damper actuator voltage to a second economizer damper actuator voltage $x_2$ to position the economizer outdoor air dampers to a second damper position;

computing a second outdoor air fraction, $OAF_2$;

performing a curve fit to ordered pairs of the economizer damper actuator voltage ($x_1$, and $x_2$) and the corresponding OAF measurements ($OAF_1$ and $OAF_2$) to obtain a mathematical formula for economizer damper actuator voltage x as a function of OAF;

computing the required economizer damper actuator voltage, $x_r$, as a function of the desired $OAF_d$;

using the required economizer damper actuator voltage, $x_r$, to position the economizer outdoor air dampers to third position.

25. The method of claim 24, further including after adjusting the economizer outdoor air damper using the required economizer damper actuator voltage, $x_r$:

computing a new measured $OAF_m$;

determining if the new measured $OAF_m$ is within an acceptable tolerance of the desired $OAF_d$;

if the new measured $OAF_m$ is not within an acceptable tolerance of the desired $OAF_d$, replacing either the first economizer damper actuator voltage $x_1$ or the second economizer damper actuator voltage $x_2$ with the required economizer damper actuator voltage, $x_r$ and repeating computing the required economizer damper actuator voltage, $x_r$ and using the required economizer damper actuator voltage, $x_r$ to position the economizer outdoor air damper to a third position.

26. The method of claim 24, further including:

setting the economizer damper actuator voltage to a third economizer damper actuator voltage, $x_3$ to position the economizer outdoor air dampers to a third damper position;

computing a third outdoor air fraction, $OAF_3$; and performing a curve fit comprises performing a 2nd order curve fit to ordered pairs of the economizer damper actuator voltage ($x_1$, $x_2$, and $x_3$) and the corresponding OAF measurements ($OAF_1$, $OAF_2$ and $OAF_3$) to obtain the mathematical formula for economizer damper actuator voltage x as a function of OAF.

27. The method of claim 26, wherein:

$x_1$, and $OAF_1$ correspond to a damper position between a closed damper position and a fully open damper position;

$x_2$, and $OAF_2$ correspond to the closed damper position; and $x_3$, and $OAF_3$ correspond to the fully open damper position.

28. The method of claim 27, further including after adjusting the economizer outdoor air damper using the required economizer damper actuator voltage, $x_r$:

computing a new measured $OAF_m$;

determining if the new measured $OAF_m$ is within an acceptable tolerance of the desired $OAF_d$;

if the new measured $OAF_m$ is not within an acceptable tolerance of the desired $OAF_d$, replacing $OAF_1$ with $OAF_r$ and $x_1$ with $x_r$, and repeating the method for computing and applying the required economizer damper actuator voltage, $x_r$ to position the economizer outdoor air damper.

29. The method of claim 24, further including measuring the temperature split (TS) across the air conditioner evaporator when the HVAC system is operating in cooling mode, comprising:
  measuring a return air drybulb temperature, $t_r$;
  measuring a return air wetbulb temperature, $t^*_r$;
  measuring a supply air drybulb temperature, $t_s$;
  computing an actual temperature split across the evaporator, $\delta T_a$, in cooling mode based on the difference between the return air drybulb temperature, $t_r$, minus the supply air drybulb temperature, $t_s$;
  computing a target temperature split, $\delta T_t$, in cooling mode across the evaporator using either a target temperature split lookup table or bi-quadratic equation wherein independent variables are the return air drybulb temperature, $t_r$, and the return air wetbulb temperature, $t^*_r$;
  computing a delta temperature split, $\Delta TS$, across the evaporator in cooling mode wherein the $\Delta TS$ is equal to the actual temperature split, $\delta T_a$, minus the target temperature split, $\delta T_t$;
  if $\Delta TS$ is within an acceptable minimum to maximum temperature split range, then the cooling system is within tolerances for proper airflow and sensible cooling capacity and no FDD alarm signal is generated for the cooling system;
  if the $\Delta TS$ is greater than a maximum acceptable temperature split tolerance, then the airflow is low and generating a first FDD alarm signal reporting a low airflow fault; and
  if $\Delta TS$ is less than a minimum acceptable temperature split tolerance, then a sensible cooling capacity is low, and generating a second FDD alarm signal reporting at least one fault selected from the group consisting of:
    a low cooling capacity fault for the system, and
    an excess outdoor air ventilation fault for the system; and
  wherein the first and second FDD alarm signals are generated using an error code, a signal, a text message, an email, or other information displayed on a standard thermostat, WIFI-enabled thermostat, internet-connected computer, internet telephony system, or smart phone software application indicating maintenance requirements for a technician to check low airflow or low cooling capacity.

30. The method of claim 24, further including measuring the temperature rise (TR) across the heat exchanger when the HVAC system is operating in heating mode, comprising:
  measuring a supply air drybulb temperature, $t_s$;
  measuring a return air drybulb temperature, $t_r$;
  computing an actual temperature rise, $\delta TR_a$, across a heat exchanger in the heating mode based on the measured supply air drybulb temperature, $t_s$, minus the measured return air drybulb temperature, $t_r$;
  determining a target temperature rise, $\delta TR_t$, across the heat exchanger based on lookup tables or manufacturer data based on the measured outdoor air temperature, $t_o$, an airflow (cfm), or a hot water supply temperature, $t_{hw}$;
  calculating a delta temperature rise difference, $\Delta TR$, based on the actual temperature rise difference, $\delta TR_a$, minus the target temperature rise difference, $\delta TR_t$; and
  evaluating proper heating capacity based on a minimum acceptable threshold tolerance for the delta temperature rise difference, $\Delta TR$, or proper furnace temperature rise based on a maximum acceptable threshold tolerance for the delta temperature rise difference, $\Delta TR$;
  if $\Delta TR$ is within an acceptable minimum to maximum temperature range, then the heating system is within tolerances for proper airflow and heating capacity and no FDD alarm signal is generated for the heating system;
  if the $\Delta TR$ is greater than a maximum acceptable temperature tolerance, then the airflow is low and generating a first FDD alarm signal reporting a low airflow fault; and
  if $\Delta TR$ is less than a minimum acceptable temperature tolerance, then a heating capacity is low, and generating a second FDD alarm signal reporting at least one fault selected from the group consisting of:
    a low heating capacity fault for the system, and
    an excess outdoor air ventilation fault for the system; and
  wherein the first and second FDD alarm signals are generated using an error code, a signal, a text message, an email, or other information displayed on a standard thermostat, WIFI-enabled thermostat, internet-connected computer, internet telephony system, or smart phone software application indicating maintenance requirements for a technician to check low airflow or low heating capacity.

31. A method of claim 29, wherein the low cooling capacity fault for the system includes at least one fault selected from the group consisting of:
  dirty or blocked air filters, blocked evaporator caused by dirt or ice, blocked condenser coils caused by dirt or debris, restrictions, non-condensables, low refrigerant charge, refrigerant leaks, loose wire connections, defective thermostats, capacitors, relays, contactors, motors, fans, expansion valves, reversing valves, compressors, improper economizer operation, improper damper position, and duct leakage.

32. A method for performing Fault Detection Diagnostics (FDD) of a cooling capacity based on a temperature split (TS) across an air conditioner evaporator when a Heating, Ventilating, Air Conditioning (HVAC) system is operating in cooling mode, the method comprising:
  measuring a return air drybulb temperature, $t_r$;
  measuring a return air wetbulb temperature, $t^*_r$;
  measuring a supply air drybulb temperature, $t_s$;
  computing an actual temperature split across the evaporator, $\delta T_a$, in cooling mode based on the difference between the return air drybulb temperature, $t_r$, minus the supply air drybulb temperature, $t_s$;
  computing a target temperature split, $\delta T_t$, in cooling mode across the evaporator using either a target temperature split lookup table or bi-quadratic equation wherein independent variables are the return air drybulb temperature, $t_r$, and the return air wetbulb temperature, $t^*_r$;
  computing a delta temperature split, $\Delta TS$, across the evaporator in cooling mode wherein the $\Delta TS$ is equal to the actual temperature split, $\delta T_a$, minus the target temperature split, $\delta T_t$;
  if $\Delta TS$ is within an acceptable minimum to maximum temperature split range, then the cooling system is within tolerances for proper airflow and sensible cooling capacity and no FDD alarm signal is generated for the cooling system;
  if the $\Delta TS$ is greater than a maximum acceptable temperature split tolerance, then the airflow is low and generating a first FDD alarm signal reporting a low airflow fault; and
  if $\Delta TS$ is less than a minimum acceptable temperature split tolerance, then a sensible cooling capacity is low, and generating a second FDD alarm signal reporting at least one fault selected from the group consisting of:

a low cooling capacity fault for the system, and
an excess outdoor air ventilation fault for the system; and wherein the first and second FDD alarm signals are generated using an error code, a signal, a text message, an email, or other information displayed on a standard thermostat, WIFI-enabled thermostat, internet-connected computer, internet telephony system, or smart phone software application indicating maintenance requirements for a technician to check low airflow or low cooling capacity.

33. The method of claim 32, further including, if $\Delta TS$ is less than a minimum acceptable temperature split tolerance and the HVAC system has outdoor air dampers, then at least partially closing the outdoor air dampers and re-measuring the $t_r$, the $t^*_r$, and the $t_s$, and re-computing the $\delta T_a$ and the $\delta T_t$, and re-computing the $\Delta TS$ before determining the FDD alarm signals.

34. A method of claim 32, further including if the measured $\Delta TS$ is greater than or equal to the minimum acceptable temperature split tolerance in cooling mode with the outdoor air dampers closed, then opening the outdoor air dampers to the minimum position.

35. Method of claim 32, wherein the target temperature split, $\delta T_t$, used to evaluate the sensible cooling capacity in cooling mode across the evaporator is calculated using a bi-quadratic equation; and the bi-quadratic equation used to calculate target temperature split, $\delta T_t$:

$$\delta T_t = C_7 + C_8 t_r + C_9 t_r^2 + C_{10} t^*_r + C_{11} t^{*2}_r + C_{12}(t_r \times t^*_r); \text{ and}$$

wherein
the first coefficient, $C_7$, is equal to $-6.509848526$ (F); and
the second coefficient, $C_8$, is equal to $-0.942072257$ ($F^{-1}$); and
the third coefficient, $C_9$, is equal to $0.009925115$ ($F^{-2}$); and
the fourth coefficient, $C_{10}$, is equal to $1.944471104$ ($F^{-1}$); and
the fifth coefficient, $C_{11}$, is equal to $-0.0208034037991888$ ($F^{-2}$); and
the sixth coefficient, $C_{12}$, is equal to $-0.000114841$ ($F^{-2}$).

36. A method of claim 33, wherein the low cooling capacity fault for the system includes at least one fault selected from the group consisting of:
dirty or blocked air filters, blocked evaporator caused by dirt or ice, blocked condenser coils caused by dirt or debris, restrictions, non-condensables, low refrigerant charge, refrigerant leaks, loose wire connections, defective thermostats, capacitors, relays, contactors, motors, fans, expansion valves, reversing valves, compressors, improper economizer operation, improper damper position, and duct leakage.

37. A method of claim 32, wherein the low cooling capacity fault for the system includes at least one fault selected from the group consisting of:
dirty or blocked air filters, blocked evaporator caused by dirt or ice, blocked condenser coils caused by dirt or debris, restrictions, non-condensables, low refrigerant charge, refrigerant leaks, loose wire connections, defective thermostats, capacitors, relays, contactors, motors, fans, expansion valves, reversing valves, compressors, improper economizer operation, improper damper position, and duct leakage.

38. A method for performing Fault Detection Diagnostics (FDD) of a heating capacity based on a temperature rise (TR) across a heat exchanger when a Heating, Ventilating, Air Conditioning (HVAC) system is operating in heating mode, the method comprising:
measuring a supply air drybulb temperature, $t_s$;
measuring a return air drybulb temperature, $t_r$;
computing an actual temperature rise, $\delta TR_a$, across a heat exchanger in the heating mode based on the measured supply air drybulb temperature, $t_s$, minus the measured return air drybulb temperature, $t_r$;
determining a target temperature rise, $\delta TR_t$, across the heat exchanger based on lookup tables or manufacturer data based on the measured outdoor air temperature, $t_o$, an airflow (cfm), or a hot water supply temperature, $t_{hw}$;
calculating a delta temperature rise difference, $\Delta TR$, based on the actual temperature rise difference, $\delta TR_a$, minus the target temperature rise difference, $\delta TR_t$; and
evaluating proper heating capacity based on a minimum acceptable threshold tolerance for the delta temperature rise difference, $\Delta TR$, or proper furnace temperature rise based on a maximum acceptable threshold tolerance for the delta temperature rise difference, $\Delta TR$;
if $\Delta TR$ is within an acceptable minimum to maximum temperature range, then the heating system is within tolerances for proper airflow and heating capacity and no FDD alarm signal is generated for the heating system;
if the $\Delta TR$ is greater than a maximum acceptable temperature tolerance, then the airflow is low and generating a first FDD alarm signal reporting a low airflow fault; and
if $\Delta TR$ is less than a minimum acceptable temperature tolerance, then a heating capacity is low, and generating a second FDD alarm signal reporting at least one fault selected from the group consisting of:
a low heating capacity fault for the system, and
an excess outdoor air ventilation fault for the system;
wherein the first and second FDD alarm signals are generated using an error code, a signal, a text message, an email, or other information displayed on a standard thermostat, WIFI-enabled thermostat, internet-connected computer, internet telephony system, or smart phone software application indicating maintenance requirements for a technician to check low airflow or low heating capacity.

39. The method of claim 38, further including, if $\Delta TR$ is less than a minimum acceptable temperature rise tolerance in heating mode when the HVAC system has outdoor air dampers, then at least partially closing the outdoor air dampers and re-measuring the $t_s$ and the $t_r$, and re-computing the $\delta TR_a$ and the $\delta TR_t$, and re-computing the $\Delta TR$ before determining the FDD alarm signals.

40. The method of claim 38, further including if the measured $\Delta TR$ is greater than or equal to the minimum acceptable temperature rise tolerance in heating mode with the outdoor air dampers closed, then opening the outdoor air dampers to the minimum position.

41. The method of claim 38, wherein the low heating capacity fault for a gas furnace heating system includes at least one fault selected from the group consisting of:
excess outdoor airflow, improper damper position, improper economizer operation, dirty or blocked air filters, low blower speed, blocked heat exchanger caused by dirt buildup, loose wire connections, improper gas pressure or valve setting, sticking gas valve, bad switch or flame sensor, ignition failure, misaligned spark electrodes, open rollout, open limit switch, limit switch cycling burners, false flame sensor, cracked heat exchanger, combustion vent restriction, improper orifice or burner alignment, or non-functional furnace.

42. The method of claim 39, wherein the low heating capacity fault for a gas furnace heating system includes at least one fault selected from the group consisting of:

excess outdoor airflow, improper damper position, improper economizer operation, dirty or blocked air filters, low blower speed, blocked heat exchanger caused by dirt buildup, loose wire connections, improper gas pressure or valve setting, sticking gas valve, bad switch or flame sensor, ignition failure, misaligned spark electrodes, open rollout, open limit switch, limit switch cycling burners, false flame sensor, cracked heat exchanger, combustion vent restriction, improper orifice or burner alignment, or non-functional furnace.

43. The method of claim 38, wherein the low heating capacity fault for a heat pump heating system includes at least one fault selected from the group consisting of:

excess outdoor airflow, improper damper position, improper economizer operation, dirty or blocked air filters, blocked heat pump indoor coil caused by dirt buildup, improper thermostat setup or malfunction, loose wire connections, blocked outdoor coil caused by ice, dirt or debris, defective capacitor or relay, failed outdoor coil fan motor or capacitor, failed reversing valve or improper reversing valve control, improper refrigerant charge, refrigerant restriction, non-condensable air or water vapor in system, malfunctioning defrost controller, high airflow above 450 cfm/ton, failing compressor, or non-functional heat pump.

44. The method of claim 39, wherein the low heating capacity fault for a heat pump heating system includes at least one fault selected from the group consisting of:

excess outdoor airflow, improper damper position, improper economizer operation, dirty or blocked air filters, blocked heat pump indoor coil caused by dirt buildup, improper thermostat setup or malfunction, loose wire connections, blocked outdoor coil caused by ice, dirt or debris, defective capacitor or relay, failed outdoor coil fan motor or capacitor, failed reversing valve or improper reversing valve control, improper refrigerant charge, refrigerant restriction, non-condensable air or water vapor in system, malfunctioning defrost controller, high airflow above 450 cfm/ton, failing compressor, or non-functional heat pump.

45. The method of claim 38, wherein the low heating capacity fault for a hydronic heating system includes at least one fault selected from the group consisting of:

excess outdoor airflow, improper damper position, improper economizer operation, dirty or blocked air filters, blocked hydronic coil caused by dirt buildup, improper thermostat setup or malfunction, loose wire connections, failed or stuck hydronic control valve, defective capacitor or relay, low hot water temperature setting, failed water heater or boiler, leak or loss of hydronic fluid, failed capacitor, high airflow above 450 cfm/ton, air in hydronic system, or non-functional hydronic circulation controller or pump.

46. The method of claim 39, wherein the low heating capacity fault for a hydronic heating system includes at least one fault selected from the group consisting of:

excess outdoor airflow, improper damper position, improper economizer operation, dirty or blocked air filters, blocked hydronic coil caused by dirt buildup, improper thermostat setup or malfunction, loose wire connections, failed or stuck hydronic control valve, defective capacitor or relay, low hot water temperature setting, failed water heater or boiler, leak or loss of hydronic fluid, failed capacitor, high airflow above 450 cfm/ton, air in hydronic system, or non-functional hydronic circulation controller or pump.

* * * * *